United States Patent
Dodge

(10) Patent No.: US 8,412,752 B2
(45) Date of Patent: Apr. 2, 2013

(54) FILE SYSTEM HAVING TRANSACTION RECORD COALESCING

(75) Inventor: Dan Dodge, Nepean (CA)

(73) Assignee: QNX Software Systems Limited, Kanata, Ontario (CA)

( * ) Notice: Subject to any disclaimer, the term of this patent is extended or adjusted under 35 U.S.C. 154(b) by 0 days.

(21) Appl. No.: 12/955,524

(22) Filed: Nov. 29, 2010

(65) Prior Publication Data

US 2011/0072060 A1    Mar. 24, 2011

Related U.S. Application Data

(63) Continuation of application No. 11/450,141, filed on Jun. 9, 2006, now Pat. No. 7,873, 683.

(60) Provisional application No. 60/695,941, filed on Jul. 1, 2005.

(51) Int. Cl.
   *G06F 12/00* (2006.01)
   *G06F 13/00* (2006.01)
   *G06F 17/30* (2006.01)

(52) U.S. Cl. .......................... 707/824; 707/826; 711/104

(58) Field of Classification Search .................. 707/826, 707/824, 999.101; 711/104
   See application file for complete search history.

(56) References Cited

U.S. PATENT DOCUMENTS

| | | | |
|---|---|---|---|
| 4,882,703 A | 11/1989 | Nicolai | 364/900 |
| 4,926,317 A | 5/1990 | Wallach et al. | 364/200 |
| 4,945,475 A | 7/1990 | Bruffey et al. | 364/200 |
| 5,187,786 A | 2/1993 | Densmore et al. | 395/600 |

(Continued)

FOREIGN PATENT DOCUMENTS

| | | |
|---|---|---|
| CA | 2 419 883 A1 | 8/2004 |
| CN | 1289966 A | 4/2001 |

(Continued)

OTHER PUBLICATIONS

U.S. Appl. No. 13/158,108, filed Jun. 10, 2011, Dodge et al.

(Continued)

*Primary Examiner* — Brannon W Smith
(74) *Attorney, Agent, or Firm* — Brinks Hofer Gilson & Lione

(57) ABSTRACT

An electronic data system comprises memory storage having stored data, file system software, and a transaction file. The transaction file is maintained by the file system software, and includes a plurality of transaction records corresponding to transactions that have been or are to be executed on one or more files and/or the or more directories of the file system. The file system software operates to organize and maintain the stored data in the files and directories and also to coalesce multiple transaction records meeting one or more criteria into fewer coalesced transaction records. The physical memory space required by the transaction file is reduced by the transaction record coalescing. The coalesced transaction records may be constructed so that they represent a logical result of applying each transaction record of a transaction record set in chronological order. Once the coalesced transaction records have been committed in the file system, the physical memory used by the original transaction records in the set may be reclaimed for further use (e.g., to store further transaction records) or may be otherwise removed from further use (e.g., when the physical memory is located in a block of memory in a flash-like memory device that has reached its maximum number of write and/or erase cycles).

15 Claims, 16 Drawing Sheets

U.S. PATENT DOCUMENTS

| | | |
|---|---|---|
| 5,201,044 A | 4/1993 | Frey, Jr. et al. ............... 395/575 |
| 5,222,217 A | 6/1993 | Blount et al. ................ 395/325 |
| 5,369,757 A | 11/1994 | Spiro et al. ................ 395/575 |
| 5,375,233 A | 12/1994 | Kimber et al. ............... 395/600 |
| 5,454,103 A | 9/1995 | Coverston et al. ........... 395/600 |
| 5,455,944 A | 10/1995 | Haderle et al. ............... 395/600 |
| 5,530,849 A | 6/1996 | Hanushevsky et al. ....... 395/600 |
| 5,535,411 A | 7/1996 | Speed et al. ................ 395/800 |
| 5,668,958 A | 9/1997 | Bendert et al. ............... 395/308 |
| 5,726,989 A | 3/1998 | Dokic ........................ 370/509 |
| 5,765,172 A | 6/1998 | Fox ............................ 707/204 |
| 5,774,715 A | 6/1998 | Madany et al. ............... 395/612 |
| 5,806,085 A | 9/1998 | Berliner ...................... 711/113 |
| 5,897,661 A | 4/1999 | Baranovsky et al. ......... 711/170 |
| 5,960,436 A | 9/1999 | Chang et al. ................. 707/101 |
| 5,983,293 A | 11/1999 | Murakami .................... 710/56 |
| 5,995,980 A | 11/1999 | Olson et al. .................. 707/201 |
| 6,058,400 A | 5/2000 | Slaughter ..................... 707/201 |
| 6,097,380 A | 8/2000 | Crites et al. .................. 345/302 |
| 6,160,796 A | 12/2000 | Zou ............................. 370/257 |
| 6,173,291 B1 | 1/2001 | Jenevein ....................... 707/200 |
| 6,175,900 B1 | 1/2001 | Forin et al. ................... 711/156 |
| 6,185,663 B1 | 2/2001 | Burke .......................... 711/156 |
| 6,286,013 B1 | 9/2001 | Reynolds et al. ............. 707/200 |
| 6,292,808 B1 | 9/2001 | Obermarck et al. .......... 707/202 |
| 6,324,637 B1 | 11/2001 | Hamilton ...................... 711/216 |
| 6,356,863 B1 | 3/2002 | Sayle ........................... 703/27 |
| 6,377,992 B1 | 4/2002 | Plaza Fernández et al. .. 709/227 |
| 6,389,427 B1 | 5/2002 | Faulkner ................... 707/104.1 |
| 6,389,513 B1 | 5/2002 | Closson ........................ 711/129 |
| 6,396,421 B1 | 5/2002 | Bland ........................... 341/61 |
| 6,412,042 B1 | 6/2002 | Paterson et al. .............. 711/112 |
| 6,438,661 B1 | 8/2002 | Beardsley et al. ............ 711/144 |
| 6,467,021 B1 | 10/2002 | Sinclair ........................ 711/113 |
| 6,496,944 B1 | 12/2002 | Hsiao et al. .................. 714/15 |
| 6,509,850 B1 | 1/2003 | Bland ........................... 341/61 |
| 6,571,259 B1 | 5/2003 | Zheng et al. ................. 707/205 |
| 6,584,582 B1 | 6/2003 | O'Connor .................... 714/21 |
| 6,591,376 B1 | 7/2003 | VanRooven et al. .......... 714/36 |
| 6,606,628 B1 | 8/2003 | Monsen et al. ............... 707/200 |
| 6,661,357 B2 | 12/2003 | Bland ........................... 341/61 |
| 6,675,177 B1 | 1/2004 | Webb ........................... 707/200 |
| 6,732,124 B1 | 5/2004 | Koseki et al. ................. 707/202 |
| 6,748,491 B2 | 6/2004 | Rodriguez .................... 711/122 |
| 6,754,696 B1 | 6/2004 | Kamath et al. ................ 709/213 |
| 6,845,401 B1 | 1/2005 | Papadopoulos et al. ...... 709/250 |
| 6,856,993 B1 | 2/2005 | Verma et al. ................. 707/101 |
| 6,922,708 B1 | 7/2005 | Sedlar .......................... 707/202 |
| 6,983,462 B2 | 1/2006 | Savov et al. |
| 7,003,619 B1 | 2/2006 | Moore et al. ................. 711/102 |
| 7,047,257 B2 | 5/2006 | Fletcher et al. ............... 707/201 |
| 7,076,599 B2 | 7/2006 | Aasheim et al. .............. 711/103 |
| 7,096,248 B2 | 8/2006 | Masters et al. ............... 709/201 |
| 7,139,752 B2 | 11/2006 | Broder et al. ................. 707/4 |
| 7,181,463 B2 | 2/2007 | Moore et al. ................. 707/102 |
| 7,191,185 B2 | 3/2007 | Dweck et al. ................ 707/102 |
| 7,349,927 B2 | 3/2008 | Kanai et al. .................. 707/200 |
| 7,359,934 B1 | 4/2008 | Ricart et al. .................. 709/203 |
| 7,383,286 B2 | 6/2008 | Hamanaka et al. ........... 707/200 |
| 7,529,784 B2 | 5/2009 | Kavuri et al. ................. 707/204 |
| 7,555,483 B2 | 6/2009 | Maeda et al. ................. 707/10 |
| 7,565,452 B2 | 7/2009 | Freiburg et al. .............. 709/246 |
| 7,676,691 B2 * | 3/2010 | Fachan et al. ................ 714/15 |
| 7,743,111 B2 | 6/2010 | Soltis ........................... 709/217 |
| 7,599,972 C1 | 6/2012 | Dodge et al. |
| 2001/0044798 A1 | 11/2001 | Nagral et al. ................. 707/102 |
| 2002/0019936 A1 | 2/2002 | Hitz et al. ..................... 713/165 |
| 2002/0048223 A1 | 4/2002 | Ota et al. ...................... 369/1 |
| 2002/0120634 A1 | 8/2002 | Min et al. ..................... 707/200 |
| 2002/0143862 A1 | 10/2002 | Peterson ....................... 709/203 |
| 2002/0156840 A1 | 10/2002 | Ulrich et al. .................. 709/203 |
| 2002/0156891 A1 | 10/2002 | Ulrich et al. .................. 709/225 |
| 2002/0156937 A1 | 10/2002 | Wong et al. .................. 709/328 |
| 2002/0156938 A1 | 10/2002 | Wong et al. .................. 709/328 |
| 2002/0156975 A1 | 10/2002 | Staub et al. ................... 711/114 |
| 2002/0165942 A1 | 11/2002 | Ulrich et al. .................. 709/219 |
| 2002/0174295 A1 | 11/2002 | Ulrich et al. .................. 711/114 |
| 2002/0178271 A1 | 11/2002 | Graham et al. ............... 709/229 |
| 2002/0194309 A1 | 12/2002 | Carter et al. .................. 709/219 |
| 2003/0021346 A1 | 1/2003 | Bixby et al. ............. 375/240.25 |
| 2003/0061316 A1 | 3/2003 | Blair et al. .................... 709/220 |
| 2003/0065682 A1 | 4/2003 | Nakajima ..................... 707/200 |
| 2003/0070001 A1 | 4/2003 | Belknap et al. ............... 709/321 |
| 2003/0074457 A1 | 4/2003 | Kluth |
| 2003/0110237 A1 | 6/2003 | Kitamura et al. ............. 709/219 |
| 2003/0115227 A1 | 6/2003 | Guthery ....................... 707/205 |
| 2003/0140210 A1 | 7/2003 | Testardi ........................ 711/203 |
| 2003/0163594 A1 | 8/2003 | Aasheim et al. .............. 709/310 |
| 2003/0225585 A1 | 12/2003 | Miller et al. .................. 705/1 |
| 2004/0064500 A1 | 4/2004 | Kolar et al. ................... 709/202 |
| 2004/0114589 A1 | 6/2004 | Alfieri et al. ................. 370/389 |
| 2004/0215600 A1 | 10/2004 | Aridor et al. ................. 707/3 |
| 2004/0236793 A1 | 11/2004 | Kanai et al. ............... 707/104.1 |
| 2004/0255048 A1 | 12/2004 | Lev Ran et al. ............... 709/249 |
| 2005/0050073 A1 | 3/2005 | Demiroski et al. ........... 707/100 |
| 2005/0060420 A1 | 3/2005 | Kovacevic .................... 709/231 |
| 2005/0080673 A1 | 4/2005 | Picker et al. .................. 705/14 |
| 2005/0091229 A1 | 4/2005 | Bali et al. ..................... 707/100 |
| 2005/0091287 A1 | 4/2005 | Sedlar .......................... 707/200 |
| 2005/0097225 A1 | 5/2005 | Glatt et al. .................... 709/248 |
| 2005/0117885 A1 | 6/2005 | Lee et al. ...................... 386/95 |
| 2005/0135341 A1 | 6/2005 | Kim .............................. 370/352 |
| 2005/0138085 A1 | 6/2005 | Verma et al. ................. 707/202 |
| 2005/0144526 A1 | 6/2005 | Banko ........................... 714/38 |
| 2005/0147130 A1 | 7/2005 | Hurwitz et al. ............... 370/503 |
| 2005/0149525 A1 | 7/2005 | Verma et al. .................. 707/8 |
| 2005/0154747 A1 | 7/2005 | Kii et al. ....................... 707/101 |
| 2005/0182799 A1 | 8/2005 | Hitz et al. ..................... 707/202 |
| 2005/0210507 A1 | 9/2005 | Hawkins et al. .............. 725/46 |
| 2005/0240588 A1 | 10/2005 | Siegel et al. .................. 707/9 |
| 2005/0246362 A1 | 11/2005 | Borland ........................ 707/101 |
| 2005/0251540 A1 | 11/2005 | Sim-Tang ..................... 707/202 |
| 2005/0256845 A1 | 11/2005 | Jen et al. ....................... 707/3 |
| 2005/0273486 A1 | 12/2005 | Keith, Jr. ...................... 709/200 |
| 2006/0005124 A1 | 1/2006 | Speicher ....................... 715/514 |
| 2006/0015431 A1 | 1/2006 | Bugaj et al. ................... 705/35 |
| 2006/0021057 A1 | 1/2006 | Risan et al. ................... 726/26 |
| 2006/0041600 A1 | 2/2006 | Lehtola et al. ................ 707/201 |
| 2006/0052091 A1 | 3/2006 | Onyon et al. |
| 2006/0069891 A1 | 3/2006 | Nishikawa et al. ........... 711/162 |
| 2006/0074851 A1 | 4/2006 | Nagai et al. ................... 707/1 |
| 2006/0117056 A1 | 6/2006 | Havewala et al. ............ 707/102 |
| 2006/0136529 A1 | 6/2006 | Pudipeddi et al. ............ 707/205 |
| 2006/0188215 A1 | 8/2006 | Matsutani ..................... 386/46 |
| 2006/0190469 A1 | 8/2006 | Kathuria et al. .............. 707/101 |
| 2006/0195480 A1 | 8/2006 | Spiegelman et al. ...... 707/104.1 |
| 2006/0206538 A1 | 9/2006 | Veazey ......................... 707/202 |
| 2006/0218195 A1 | 9/2006 | LaChapelle et al. ....... 707/104.1 |
| 2006/0224620 A1 | 10/2006 | Silverman et al. ......... 707/104.1 |
| 2006/0242179 A1 | 10/2006 | Chen et al. .................... 707/100 |
| 2006/0253502 A1 | 11/2006 | Raman et al. ................ 707/202 |
| 2006/0277183 A1 | 12/2006 | Nichols et al. ................ 707/9 |
| 2006/0282471 A1 | 12/2006 | Mark et al. |
| 2006/0287990 A1 | 12/2006 | Yoon ............................. 707/3 |
| 2007/0005560 A1 | 1/2007 | Dodge ........................... 707/1 |
| 2007/0005614 A1 | 1/2007 | Dodge ........................... 707/100 |
| 2007/0005615 A1 | 1/2007 | Dodge ........................... 707/100 |
| 2007/0005627 A1 | 1/2007 | Dodge ........................... 707/101 |
| 2007/0005874 A1 | 1/2007 | Dodge ........................... 711/103 |
| 2007/0005894 A1 | 1/2007 | Dodge ........................... 711/118 |
| 2007/0022122 A1 | 1/2007 | Bahar et al. ................... 707/10 |
| 2007/0073937 A1 | 3/2007 | Feinberg et al. .............. 710/62 |
| 2007/0083540 A1 | 4/2007 | Gundla et al. |
| 2007/0103984 A1 | 5/2007 | Kavuri et al. ............ 365/185.17 |
| 2007/0113120 A1 | 5/2007 | Dodge ........................... 714/703 |
| 2007/0185879 A1 | 8/2007 | Roublev et al. ............... 707/10 |
| 2007/0198746 A1 | 8/2007 | Myllyla et al. ................ 709/248 |
| 2007/0233936 A1 | 10/2007 | Chu .............................. 711/103 |
| 2008/0005114 A1 | 1/2008 | Li .................................. 707/9 |
| 2008/0005120 A1 | 1/2008 | Li .................................. 707/10 |
| 2008/0027998 A1 | 1/2008 | Hara ............................. 707/200 |
| 2008/0033777 A1 | 2/2008 | Shukoor ........................ 705/8 |
| 2008/0046667 A1 | 2/2008 | Fachan et al. ................. 711/154 |
| 2008/0052323 A1 | 2/2008 | Dodge et al. ................. 707/201 |
| 2008/0052329 A1 | 2/2008 | Dodge et al. ................. 707/205 |
| 2008/0059510 A1 | 3/2008 | Cardamore et al. .......... 707/102 |
| 2008/0126936 A1 | 5/2008 | Williams ...................... 715/717 |

| | | | | |
|---|---|---|---|---|
| 2008/0147747 | A1 | 6/2008 | Cardamore | 707/200 |
| 2008/0228843 | A1 | 9/2008 | Dodge et al. | 707/205 |
| 2009/0037651 | A1 | 2/2009 | Gorobets | 711/103 |
| 2009/0106196 | A1* | 4/2009 | Gutlapalli et al. | 707/3 |
| 2009/0265793 | A1 | 10/2009 | Risan et al. | 726/29 |

FOREIGN PATENT DOCUMENTS

| | | |
|---|---|---|
| CN | 1567256 A | 1/2005 |
| CN | 1705935 A | 12/2005 |
| EP | 0 410 210 A2 | 1/1991 |
| EP | 0 454 340 A2 | 10/1991 |
| EP | 0 588 488 A1 | 3/1994 |
| EP | 1 089 176 A2 | 4/2001 |
| EP | 1 522 927 A2 | 4/2005 |
| EP | 1 895 434 A1 | 3/2008 |
| JP | 2006-235717 | 8/1987 |
| JP | 06 139 124 A | 5/1994 |
| JP | 62 186 361 A | 3/1995 |
| JP | 07-078498 | 6/2001 |
| JP | 2001-175624 | 6/2001 |
| JP | 2001-175681 | 11/2002 |
| JP | 2002-334006 | 6/2003 |
| JP | 2003-173279 | 7/2003 |
| JP | 2003-216620 | 7/2005 |
| JP | 2005-182778 | 9/2006 |
| KR | 10-2004-0058213 | 7/2004 |
| KR | 10-2005-0041970 | 5/2005 |
| KR | 2006/0009717 | 2/2006 |
| KR | 10/2006/0023387 | 3/2006 |
| WO | WO 00/14632 A | 3/2000 |
| WO | WO 02/17140 A | 2/2002 |
| WO | WO 03/036541 A1 | 5/2003 |
| WO | WO 2006/061454 | 6/2006 |
| WO | WO 2006/074110 A2 | 7/2006 |

OTHER PUBLICATIONS

U.S. Appl. No. 13/221,502, filed Aug. 30, 2011, Dodge.
U.S. Appl. No. 90/011,299, filed Dec. 22, 2010, Dodge et al.
U.S. Appl. No. 12/957,999, filed Dec. 1, 2010, Dodge.
U.S. Appl. No. 12/960,197, filed Dec. 3, 2010, Dodge et al.
Cardenas, Alfonso F., "Analysis and Performance of Inverted Data Base Structures," IBM Research Laboratory, San Jose, Communication of ACM May 1975, vol. 18, No. 5, pp. 253-263.
Colyer, A. M., "Displaying and Manipulating Relationships," IBM Technical Disclosure Bulletin, Dec. 1995, vol. 38, Issue No. 12, pp. 391-396.
QNX Software Systems, "Embedded transaction filesystem (ETFS)," System Architecture, 2004, pp. 193-198.
Yim et al, "A Flash Compression Layer for SmartMedia Card Systems," IEEE Transactions on Consumer Electronics, vol. 50, No. 1., 2004, pp. 192-197.
Woodhouse, D., "JFFS: The Journalling Flash File System," Red Hat, Inc., 2005, 12 pages.
Sivathanu, Gopalan, Wright, Charles P., Zadok, Erez, Enhancing File System Integrity Through Checksums, dated Apr. 3, 2009, pp. 1-10, available at www.filesystems.org.
Muniswamy-Reddy, Kiran-Kumar, A Versatile and User-Oriented Versioning File System, Dec. 2003, pp. 1-40, Stony Brook University.
Tambat, Siddhartha V. et al., Sub-tagged Caches: Study of Variable Cache-Block Size Emulation, Jul. 31, 2001, pp. 1-16, Computer Science and Automation Department Indian Institute of Science, India.
Shuff, Pat et al., Hash Addressing Viability for Use in Distributed File Systems, 2004, pp. 1-7, Proceedings of the Winter Int'l Symposium on Information and Communication Technologies.
Pearson, Peter K., Fast Hashing of Variable-Length Text Strings, Jun. 1990, pp. 677-680, vol. 33, No. 6, Communications of the ACM.
Examination Report, dated Feb. 7, 2012, pp. 1-5, European Patent Application No. 06012983.0, European Patent Office, Germany.
Office Action, dated Dec. 20, 2011, pp. 1-10 U.S. Appl. No. 11/950,227, U.S. Patent and Trademark Office, Virginia.
Metafile—a whatis.com definition, dated Oct. 14, 2004, pp. 1-2, Whatis.com Target Search from whatis.techtarget.com/definition, downloaded from http://web.archive.org.
Canadian Examiner's Report, dated Jan. 12, 2012, pp. 1-4, Canadian Patent Application No. 2,550,871, Canadian Patent Office, Canada.
Canadian Office Action, dated Jan. 23, 2012, pp. 1-3, Canadian Patent Application No. 2,613,924, Canadian Patent Office, Canada.
Examination Report, dated Feb. 7, 2012, pp. 1-5, European Patent Application No. 06012983.1, European Patent Office, Germany.
Office Action, dated Jun. 5, 2012, pp. 1-23, U.S. Appl. No. 11/765,258, U.S. Patent and Trademark Office, Virginia.
Canadian Office Action, dated Jun. 4, 2012, pp. 1-4, Canadian Application No. 2,549,694, Canadian Patent Office, Canada.
Canadian Office Action, dated Jun. 19, 2012, pp. 1-3, Canadian Patent Application No. 2,598,349, Canadian Patent Office, Canada.
European Search Report, dated Jul. 1, 2008, pp. 1-7, European Patent Application No. 07023774.8, European Patent Office, Germany.
Korean Office Action, dated Sep. 17, 2009, pp. 1-4, Korean Patent Application No. 10-2007-0130349, Korean Patent Office, Korea.
Korean Office Action, dated Dec. 1, 2009, pp. 1-2, Korean Patent Application No. 10-2007-0130349, Korean Patent Office, Korea.
Final Office Action, dated Jul. 17, 2012, pp. 1-25, U.S. Appl. No. 11/173,945, U.S. Patent and Trademark Office, Virginia.
Office Action, dated Jul. 18, 2012, pp. 1-15, U.S. Appl. No. 13/221,502, U.S. Patent and Trademark Office, Virginia.
Canadian Office Action, dated Jul. 19, 2012, pp. 1-3, Canadian Patent Application No. 2,550,871, Canadian Patent Office, Canada.
Office Action, dated Jul. 12, 2012, pp. 1-25, U.S. Appl. No. 11/717,601, U.S. Patent and Trademark Office, Virginia.
Japanese Office Action, dated Aug. 29, 2012, pp. 1-8, Japanese Patent Application No. 2007-317757, Japanese Patent Office, Japan.

* cited by examiner

FILE SYSTEM HAVING TRANSACTION RECORD COALESCING

RELATED APPLICATIONS

This application is a continuation application of, and claims priority under 35 U.S.C. §120 to, U.S. patent application Ser. No. 11/450,141, filed Jun. 9, 2006, which claims priority to U.S. provisional patent application Ser. No. 60/695,941, filed Jul. 1, 2005, both of which are incorporated by reference.

BACKGROUND OF THE INVENTION

1. Technical Field

This invention is generally directed to a file system for use in a computer, embedded controller, or the like. More particularly, this invention is directed to a transaction based file system in which the transaction records of a transaction file of a transaction file system are coalesced based on predetermined criterion.

2. Related Art

Computers, embedded controllers, and other microprocessor based systems are typically constructed from a variety of different hardware components. The hardware components may include a processor, I/O devices, human interface devices, etc. Additionally, such systems use memory storage units to maintain the data used in the system. The memory storage units may take on a variety of different forms including, but not limited to, hard disk drives, floppy disk drives, random access memory, flash memory, etc.

High-level application programs that are executed in such systems must often interact seamlessly with these hardware components, including the memory storage units. To this end, many systems run an operating system that acts as an interface between the application programs and the system hardware. File system software may be included as part of the operating system, or it may be provided as an ancillary software component that interacts with the operating system. In either instance, the file system software organizes the data within the memory storage units for ready access by the processor and the high-level application programs that the processor executes.

There are a number of different file system classifications since there are many ways to implement a file system. For example, a transaction based file system is one in which the file system is always maintained in a consistent state since all updates to the file system structure and the data are logged as transactions to a transaction file. More particularly, all updates to the file system are made as transactions within the transaction file, and the contents of the file system are dynamically re-constituted by successively applying all of the transactions that have been committed.

A transaction in the transaction file is either committed or it has not been completed. If the operation of the file system is interrupted, such as due to a power outage, for example, the state of the file system can be restored by consulting the contents of the transaction file. Any committed transactions are used by the file system, and any transactions that are not complete are rolled back, restoring the file system to the state it was in prior to the attempted update.

Restoration of the file system to a consistent state requires that the file system software execute a predetermined startup process. During a typical startup process, the integrity of each transaction stored in the transaction file is completely verified before it becomes part of the file system. Additional file system operations may also be executed during the startup process. The traditional manner in which transaction verification and other file system operations are performed after a file system interruption, however, is often sub-standard in that the operations are time, process and resource intensive.

Once the file system has been restored to a consistent state, the file system software may operate to continually assure the integrity of the files. This task may be difficult when a large number of transaction records are at issue. Some manner of reducing the burden imposed by this task is desirable.

SUMMARY

An electronic data system comprises memory storage having stored data, file system software, and a transaction file. The transaction file is maintained by the file system software, and includes a plurality of transaction records corresponding to transactions that have been or are to be executed on one or more files and/or the or more directories of the file system. The file system software operates to organize and maintain the stored data in the files and directories and also to coalesce multiple transaction records meeting one or more criteria into fewer coalesced transaction records. The physical memory space required by the transaction file is reduced by the transaction record coalescing. The coalesced transaction records may be constructed so that they represent a logical result of applying each transaction record of a transaction record set in chronological order. Once the coalesced transaction records have been committed in the file system, the physical memory used by the original transaction records in the set may be reclaimed for further use (e.g., to store further transaction records) or may be otherwise removed from further use (e.g., when the physical memory is located in a block of memory in a flash-like memory device that has reached its maximum number of write and/or erase cycles).

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
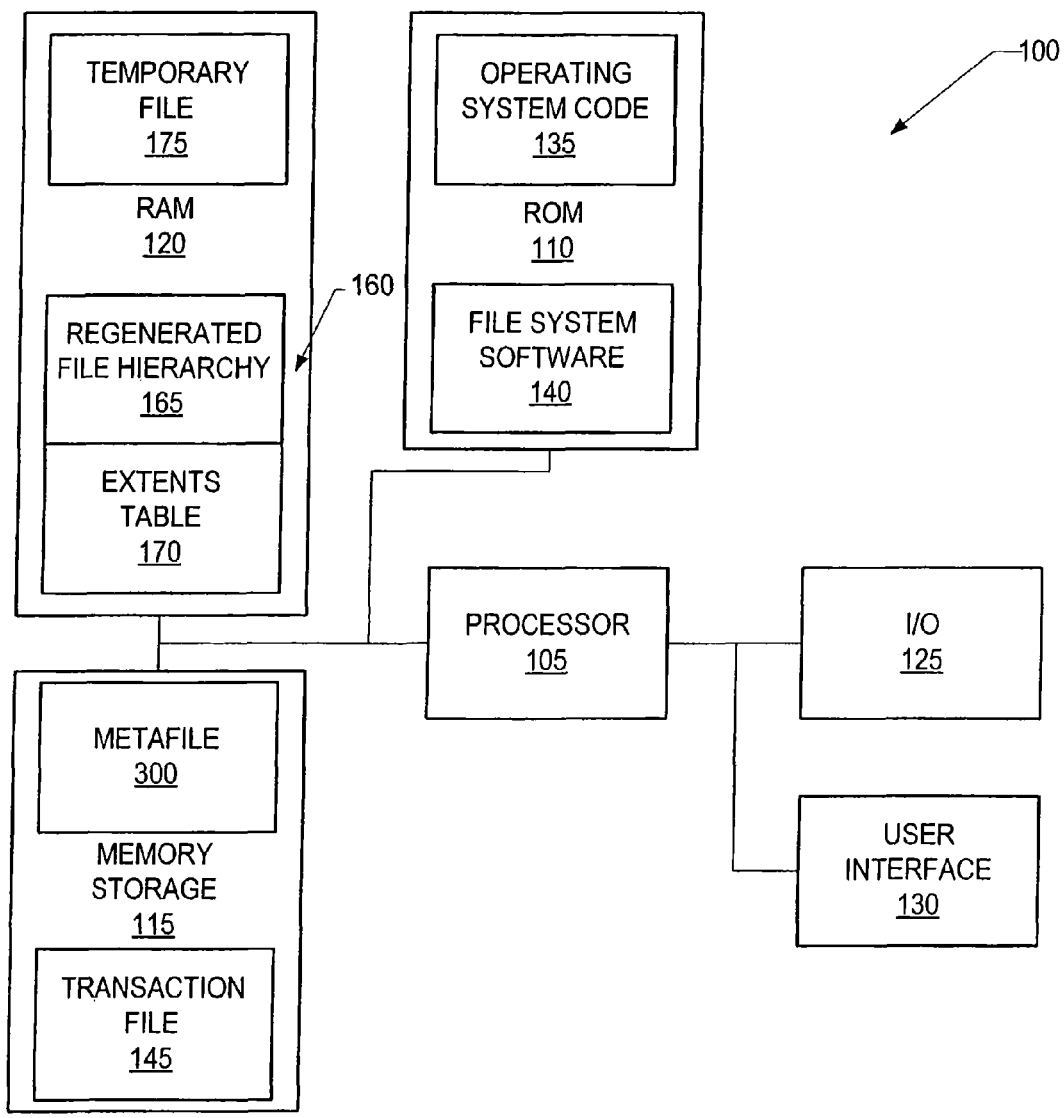
FIG. 1 is a block diagram of a computer system that may implement a transaction based file system in which startup verification of the file system integrity is optimized.

FIG. 1 illustrates the components that may be employed in an exemplary transaction based computer system 100. As shown, the exemplary system 100 includes a processor 105, read only memory 110, and memory storage 115. Computer system 100 may also include random access memory 120, an I/O interface 125, and a user interface 130. The specific components that are used in computer system 100 are tailored to the particular function(s) that are to be executed by the computer system 100. Accordingly, the presence or absence of a component, other than processor 105, may be specific to the design criterion imposed on the computer system 100. For example, user interface 130 may be omitted when the computer system 100 is to take the form of an embedded controller or the like.

Read only memory 110 may include operating system code 135 that controls the interaction between high-level application programs executed by the processor 105 and the various hardware components, including memory devices 110 and 120, the memory storage 115, and the interface devices 125 and 130. The operating system code 135 may include file system software for organizing files stored on the memory storage 115. Alternatively, the file system software may be provided as a separate software component that merely interacts with the operating system code 135. In the latter case, the code corresponding to the file system software may be stored in read only memory 110, memory storage 115 or the like. When computer system 100 is networked with other computers and/or storage devices through I/O interface 125, the file system software may be stored remotely and downloaded to computer system 100 as needed. FIG. 1, however, illustrates storage of the file system software 140 in read only memory 110.

The memory storage 115 may take on any number of different forms. For example, the memory storage 115 may be persistent storage such as a hard disc drive, floppy disk drive, etc. It may also be in the form of a non-rotating media device, such as non-volatile memory implemented in an integrated circuit format (e.g., flash memory, etc.). Still further, memory storage 115 need not be limited to a single memory structure. Rather, the memory storage 115 may include a number of separate storage devices of the same type (e.g., all flash memory) and/or separate storage devices of different types (e.g., one or more flash memory units and one or more hard disk drives).

The files stored in the memory storage 115 include data that is interpreted in accordance with a predetermined format used by an application program or by the operating system code 135. For example, the data stored within a file may constitute the software code of an executable program, the ASCII text of a database record, data corresponding to transactions executed (or not executed) by computer system 100, etc.

Figure 2:
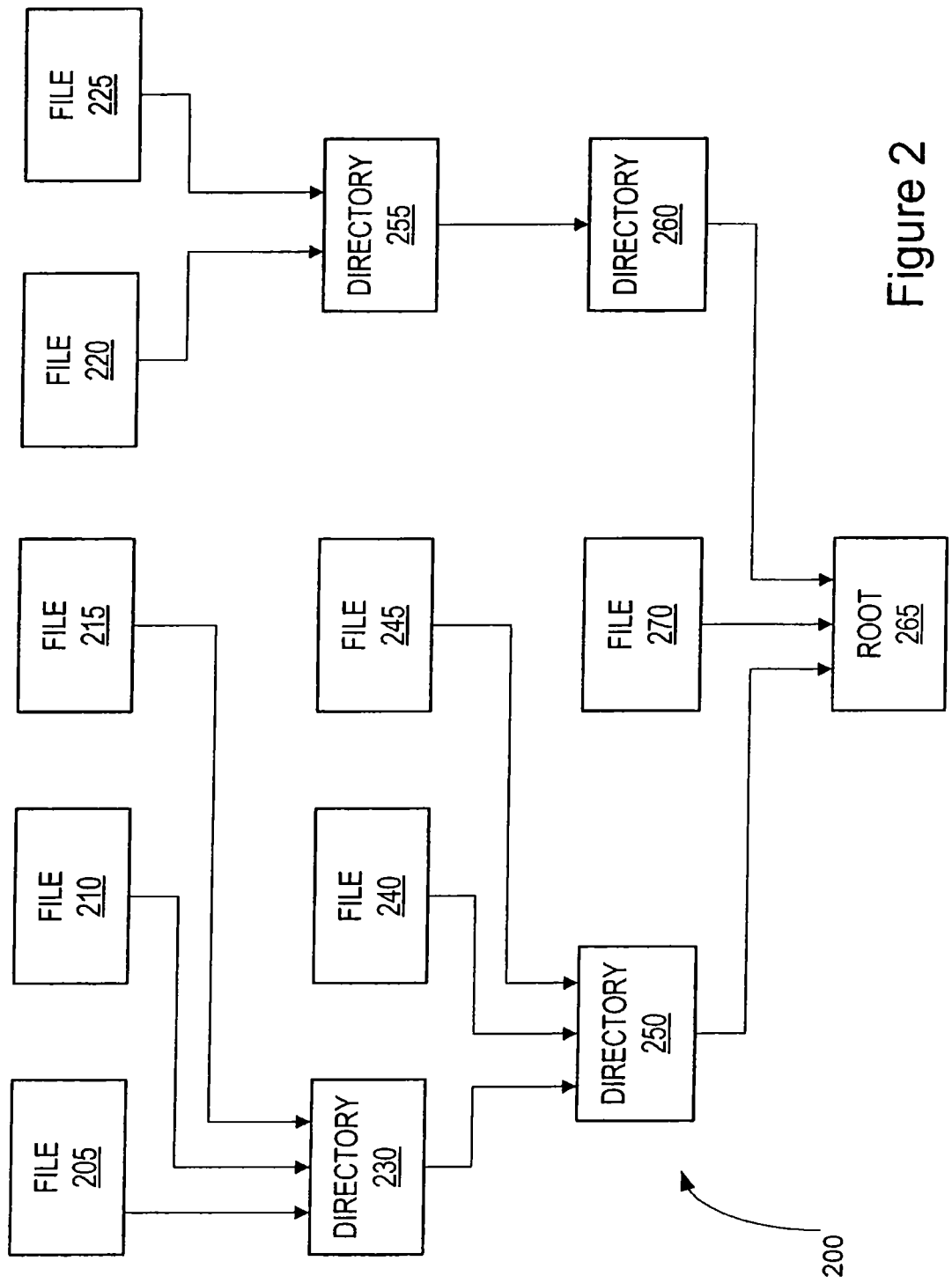
FIG. 2 is a tree diagram showing one example of an arrangement of files and directories that may be implemented in the transaction based file system.

In this exemplary system 100, the file system software 140 organizes the files stored on the memory storage 115 using an inverted hierarchical structure. FIG. 2 is a diagram showing one manner in which the inverted hierarchical structure, shown generally at 200, may be implemented. In the traditional hierarchical structures used by many file systems, the top level of the file structure begins with the root directory and each directory points downward to the files and subdirectories contained within the directory. In the exemplary inverted hierarchical structure 200, however, the child files and child directories contained within a parent directory point downward to the parent directory. Depending on where the file system begins its organization, the root directory may constitute the lowest level of the file system structure.

The exemplary inverted hierarchical structure 200 includes five files 205, 210, 215, 220, and 225, at the highest level of the file system structure. Files 205, 210, and 215 are contained within directory 230 while files 220 and 225 are contained within directory 235. Accordingly, the file system software 140 organizes the file system so that the file system records representing child files 205, 210, and 215 point to the record for their parent directory 230. Similarly, file system records representing child files 220 and 225 point to the record for their parent directory 235.

At the next level of the exemplary inverted hierarchical structure 200, files 240 and 245 as well as directory 230 are contained within directory 250, while directory 235 is contained within directory 255. Accordingly, the file system software 140 organizes the file system so that file system records representing child directory 230 and child files 240 and two under 45 point to the record for their parent directory 250. Similarly, the file system record representing child directory 255 points to the record for its parent directory 260.

The root directory 265 may form the trunk of the inverted hierarchical structure 200. In this example, directories 100 and 105 and file 270 are contained within the root directory 265. Accordingly, the file system software 140 organizes the file system so that file system records representing child directories 250 and 260 and child file 270 point to the record for their parent directory 265.

Figure 3:
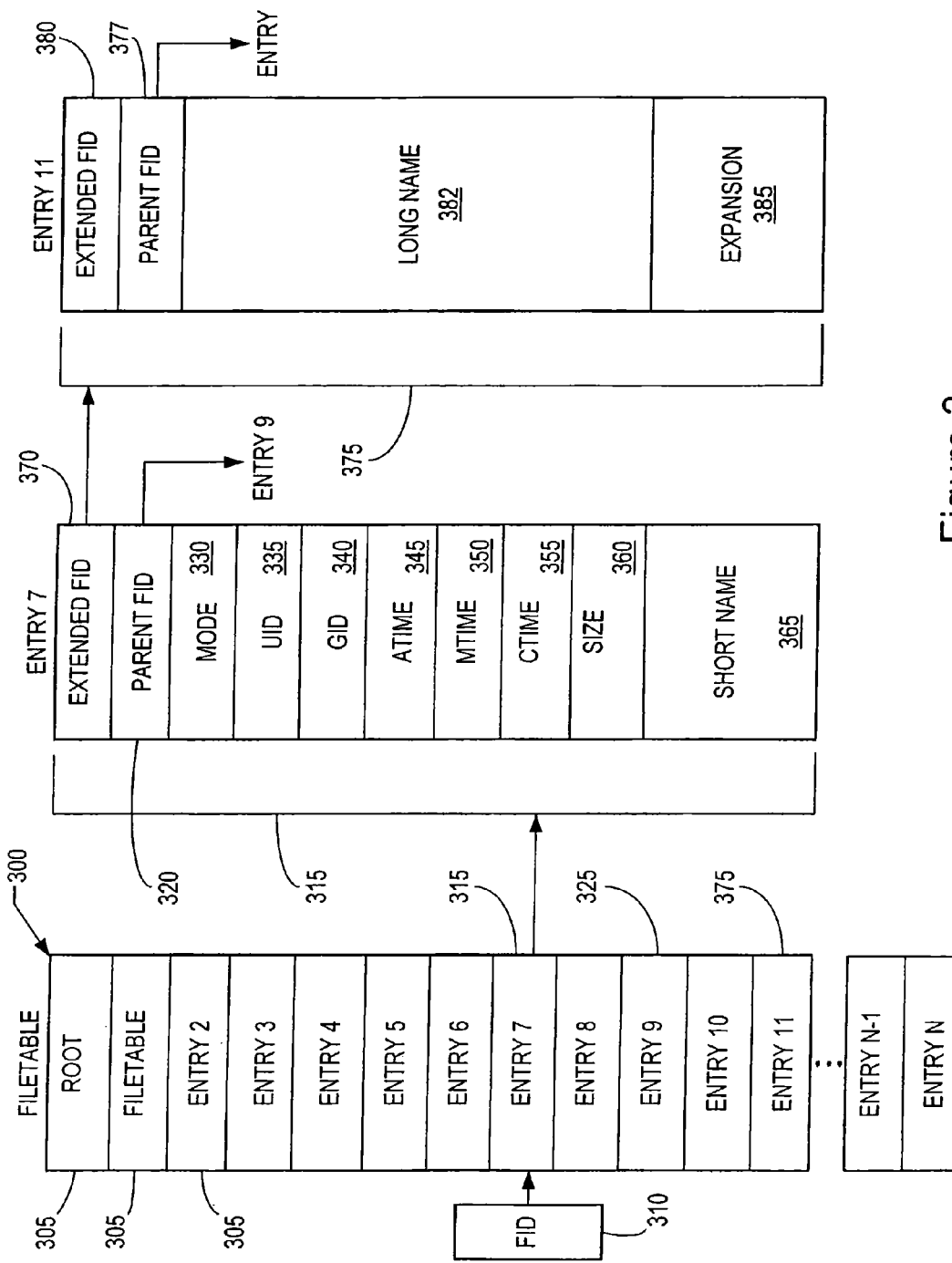
FIG. 3 is a block diagram illustrating one manner in which records of a metafile may be arranged to implement the file system structure shown in FIG. 2.

One manner in which the file system software 140 may organize the records of the file system to implement an inverted hierarchical structure is shown in FIG. 3. In this implementation of the file system, the file system software 140 generates one or more metafiles that include records corresponding to each file and directory used in the file system. FIG. 3 shows a single metafile 300 and an exemplary manner in which the records within the metafile 300 may be arranged and formatted. In this example, metafile 300 is arranged as a table that includes a plurality of equal length record entries 305. Each record entry 305 corresponds to a single file or directory used in the file system. A unique file identifier, such as the one shown at 310, is used by the file system software 140 to address a corresponding record 305 of the metafile 300. If each record entry 305 has the same record length, the format for the file identifier 310 may be chosen so that it may be used, either directly or indirectly, as an index to the desired record in metafile 300. For example, file identifier 310 may constitute an offset value that is used along with the memory address location of the first record of metafile 300 to calculate the memory address location of the first byte of the metafile record having the desired directory/file information.

In the example of FIG. 3, the file identifier 310 is pointing to record 315 (Entry 7) in metafile 300. Record 135 is shown in FIG. 3 in an expanded form adjacent to the metafile 300. The expanded form of record 315 also illustrates a basic record format that may be used for each record entry 305. In this example, record 315 includes a number of different fields containing information relating to the file or directory represented by the record. This information, among other things, corresponds to the logical location of the file or directory within the structure of the file system.

The inverted hierarchical structure of the file system may be implemented by employing a metafile record format in which each metafile record includes a pointer to the metafile record representing its parent directory. FIG. 3 shows a metafile record format in which each metafile record includes a parent identifier field 320 that stores the file identifier of its parent directory. In this example, the parent record identifier 320 of metafile record 315 corresponds to the file identifier used to address record 325 (Entry 9). Record 325, in turn, includes information pertaining to the directory containing the file or directory represented by record 315.

Each metafile record may also include other information pertaining to the directory or file that the record represents. In the exemplary record format of record 315, a number of different information fields are employed. The information fields include a mode field 330, user identification field 335, group identification field 340, access time field 345, modified time field 350, created time field 355, file size field 360 and short name field 365. The mode field 330 is used to determine whether the file or directory represented by the record is a system file/directory, a hidden file/directory, a read only file/directory, etc. The user identification field 335 and group identification field 340 contain information relating to user and group ownership of the represented file or directory. The access time field 345, modified time field 350, and created time field 355 contain information relating to the time at which the represented file or directory was last accessed, the time at which the represented file or directory was last modified and the time at which the represented file or directory was created, respectively. The size field 360 contains information on the size of the file represented by the record and is zero for directory records. Finally, the short name field 365 contains ASCII characters representing the short text name of the corresponding file or directory. The length of the short name field 365 may be chosen, for example, to conform to the POSIX standard. Additionally, each record may include hash values and/or name sums that correspond to the short name. Such hash values and/or name sums may be used by the file system software 140 to quickly search for a particular directory and/or file record.

Each record in metafile 300 may also include a field for an extended record identifier 370. The extended record identifier 370 may be used as a file identifier that points to an extended record in the metafile 300. The extended record may contain further information for the file or directory represented by the record and is particularly useful in instances in which all of the information pertaining to a particular file or directory does not fit within the memory space allocated for a single metafile record.

FIG. 3 illustrates one manner in which an extended record identifier 370 may be used. In this example, the extended record identifier 370 of record 315 corresponds to the file identifier (fid) used to access record 375 (Entry 11) in metafile 300. An exploded view of record 375 is shown adjacent the exploded view of record 315 in FIG. 3. This exploded view illustrates one record format that may be used for the extended record. As shown, each extended record may include its own parent identifier field 377. The parent identifier field 377 of an extended record, however, corresponds to the file identifier of the record that points to the extended record. In the example shown in FIG. 3, the contents of the parent identifier field 377 is used to point back to record 315 (Entry 7).

In those instances in which the memory space allocated for two record entries is insufficient to hold all of the information pertaining to a file or directory, the extended record 370 may point to yet a further extended record using its own extended record identifier, such as the one included in field 380 of record 375. Although the format for the further extended record pointed to by extended file identifier 380 is not shown, the further extended record may likewise include a parent record identifier that points back to record 375.

The type of information included in an extended record may vary between file systems. In FIG. 3, the extended record 375 includes a long name field 382 that contains ASCII characters corresponding to the text of the long name of the file or directory represented by the record 315. Further fields may be reserved in an expansion area 385 of each extended record, such as record 375, to store additional information relating to the corresponding file or directory.

In the foregoing example, the extended records used by the file system are stored in metafile 300. However, the extended records and any further extended records may alternatively be stored in a separate metafile, multiple metafiles, etc. The separate metafile(s) need not share the same storage medium with metafile 300 nor with each other. Rather, the metafiles may be stored in different storage media accessible to processor 105. Even the basic metafile records (directory and file records that do not have corresponding extended records) may be distributed among multiple files and/or multiple storage media. As such, although the metafile records of the exemplary system are stored in a single metafile, the metafile may alternatively be in the form of many individual files on the same or different storage media.

By organizing the files and directories of computer system 100 in an inverted hierarchical structure, the file system is capable of being implemented in any manner in which typical file and directory transactions (i.e., moving a file/directory, deleting a file/directory, creating a file/directory, copying a file/directory) are accomplished atomically as a change, addition or deletion of a single metafile record. In such an implementation, for example, the file/directory represented by record 315 may be moved to another directory in the hierarchy merely by changing the parent identifier 320 so that it points to the metafile record for the new parent directory. This may be accomplished with a single write operation to record 315 in the metafile 300.

The foregoing inverted hierarchical structure may be employed to optimize a transactional or log-based system. An exemplary transactional or log-based system may be constructed from the components shown in FIG. 1. In this example, a transaction file 145 is maintained in the memory storage 115 and is used to keep records of the transactions associated with each file and directory of the file system. Updates to the file system are committed atomically based on the transaction records contained in transaction file 145. In one of its simplest form, every transaction record may be stored as a single logical page that is mapped to a physical block or sector of the memory storage 115.

Figure 4:
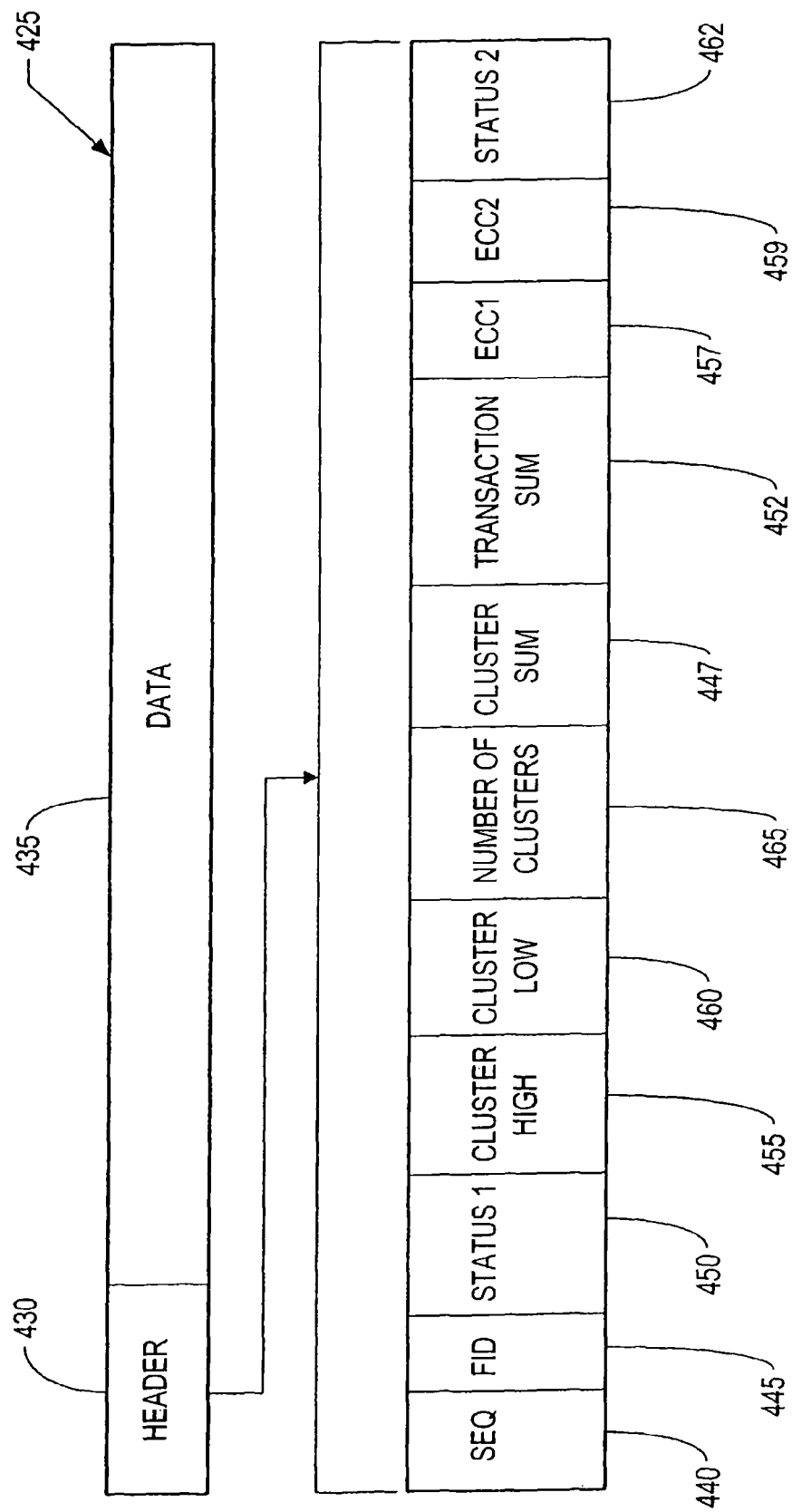
FIG. 4 illustrates one manner of logically arranging a transaction record in a transaction file of the transaction based file system.

One manner in which a transaction record 425 may be formatted for use in computer system 100 is shown in FIG. 4. Each transaction record 425 of the transaction file 145 may include a header field 430 and a corresponding data field 435. The header field 430 may include a number of different sub-fields. The sub-fields shown in FIG. 4 include a transaction sequence field 440, a file identification field 445, a transaction status field 450, a cluster high field 455, a cluster low field 460 and number of clusters field 465. Additionally, further sub-fields may be included in header 430 to verify the integrity of the transaction and for error correction. These further sub-fields include a cluster sum field 447, a transaction sum field 452, an error correction code field 457 to check and correct header 430, an error correction code field 459 to check and correct data 435, and a further status field 462 indicative of the condition of the memory locations in which the transaction record is stored.

Each of the sub-fields of header field 430 has a meaning to the file system software 140. In this example, the transaction sequence field 440 is a monotonically increasing transaction identifier that is assigned by the file system software 140. When a new transaction record is added to the transaction file 145, the value stored in the transaction sequence field 440 of the new record may be increased by a predetermined amount over the value of the transaction sequence field of the chronologically preceding transaction record. Consequently, transaction records having larger transaction identifier values are considered to have been added to the transaction file 145 later in time than transaction records having lower transaction identifier values. This chronological sequencing of the transactions, as represented by the value of the transaction sequence field 440 (and, in certain circumstances, the position of the transaction record within a block of the transaction file 145), allows the file system software 140 to apply (i.e., commit) the transactions in the proper order to maintain the integrity of the file system contents. Other ways of keeping track of the chronological sequencing of the transactions may also be used.

File system software 140 uses the transaction status field 450 to determine whether the transaction of a transaction record 425 has been committed. Once a transaction has been committed, further alteration of the committed transaction record 425 may be inhibited by the file system software 140. This ensures consistency of the file system and also allows the file system to store the transaction file 145 in, for example, write-once media, flash media, or the like.

The file identification field 445 of header 430 identifies the file that is affected by the transaction record 425. The format for the file identification field 445 may be selected so that it is the same as the file identifiers used in the metafile records. The cluster high field 455 and cluster low field 460 are used by the file system software 140 to determine the starting address (or offset) at which the data 435 is to be written into the identified file while the number of clusters field 465 is used to determine how many clusters of the identified file are to be overwritten by the data 435.

As noted above, memory storage 115 may include one or more flash memory devices. Flash memory devices store information in logic gates, called "memory cells," each of which typically stores one bit of information. More recent advances in flash memory technology have also enabled such devices to store more than 1 bit per cell, sometimes referred to as multi-level cell devices. Additionally, flash memory is non-volatile, which means that the contents of memory cells are not lost when power is withdrawn from the device.

Figure 5:
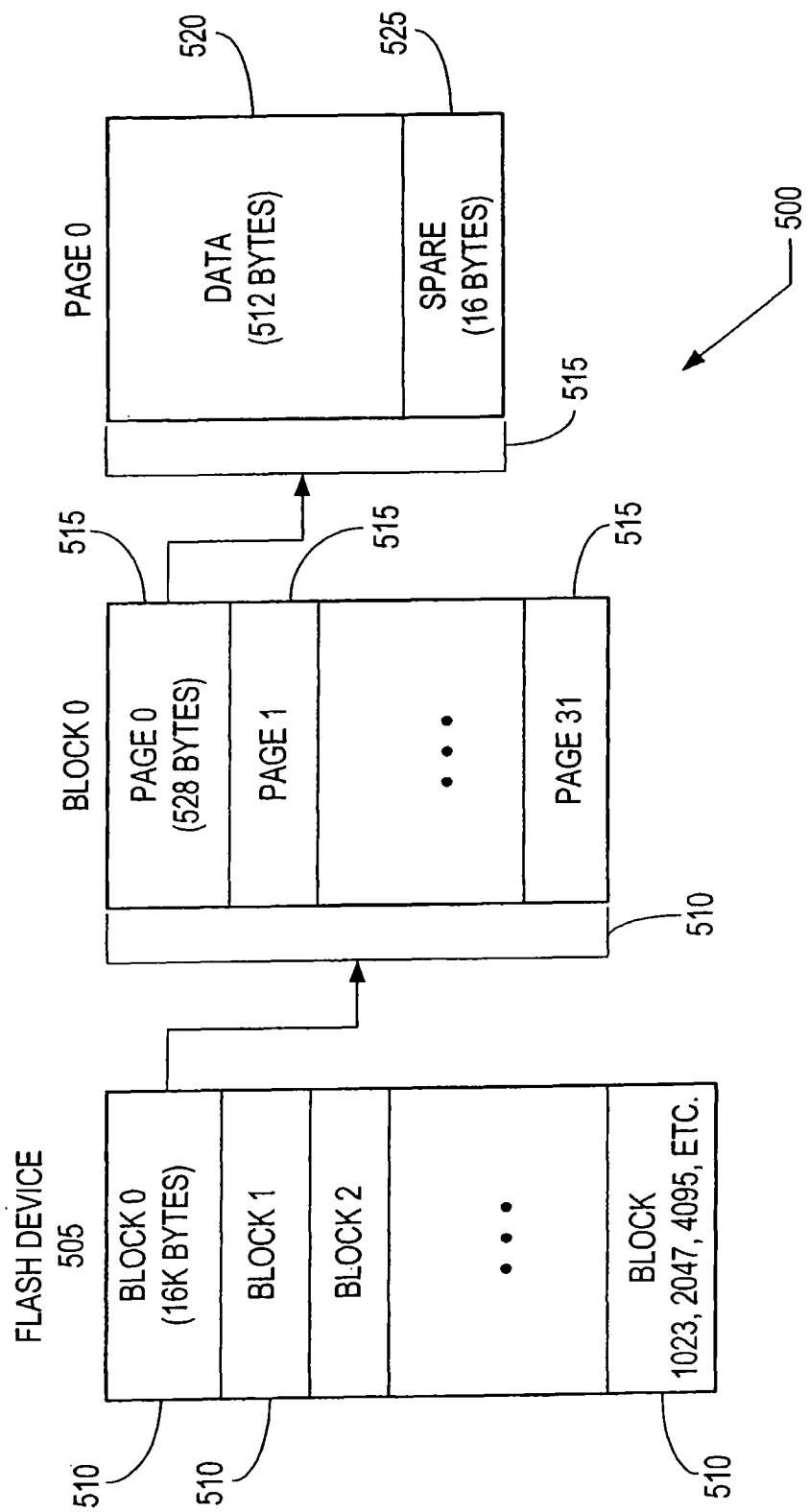
FIG. 5 shows the physical arrangement of memory in one type of flash media device.

Although flash device technology is continuously evolving, dominant technologies include NAND flash memory and NOR flash memory. NOR flash devices and NAND flash devices generally differ in the type of logic gate used for each storage cell. An exemplary logical architecture 500 of one type of NAND flash memory device 505 is shown in FIG. 5. As illustrated, the available memory on the device 505 is organized into contiguous physical blocks 510 each having an equal number of memory cells (i.e., 16K bytes). NAND flash memory device 505 further divides each of the contiguous blocks 510 into a specific number of physical sectors or pages 515. Each physical page 515, in turn, is further divided into a data area 520 and spare area 525. The data area 520 is normally reserved for storage of data, while the spare area 525 is typically reserved for maintenance of meta-information about the data stored in data area 520. The meta-information may include, for example, error-correcting codes used for verification and correction of sector contents, cyclic redundancy check data, etc.

NOR flash devices have an architecture similar to that shown in FIG. 5, except that the spare areas of each page are located on opposite sides of the data area. NOR flash devices also offer random access read and programming operations, allowing individual memory locations to be read on or read. However, once a memory location in a block has been written, NOR flash devices do not allow the block to be rewritten a smaller granularity than a block. Likewise, NOR flash devices do not allow erase operations at a smaller granularity than a block, insert quick mark saved document The data area 520 and spare area 525 are typically set to specific sizes in both NOR and NAND flash devices. For example, each page 515 of the exemplary NAND flash device 505 of FIG. 5 includes a data area 520 of 512 bytes and a spare area 525 of 16 bytes for a total page size of 528 bytes. The NAND flash device 505 also employs 32 pages 515 per block 510. Other page sizes may be used in computer system 100 and are commercially available. For example, many NAND devices include blocks having 64 pages where each page stores 2112 bytes so that the total data area per page is 2048 bytes and the spare area per page is 64 bytes.

Flash memory devices, such as NAND flash device 505, typically perform erase operations on an entire block 510 of memory at a time. An erase operation sets all bits within the block 280 to a consistent state, normally to a binary "1" value. Programming operations on an erased block 510 of flash device 505 can only change the contents of an entire page 515 (although NOR flash devices may be programmed in a slightly different manner). Once a page 515 of a NAND flash device is programmed, its state cannot be changed further until the entire block 510 is erased again. Reading of the contents of flash device 505 also occurs at the page level.

Figure 6:
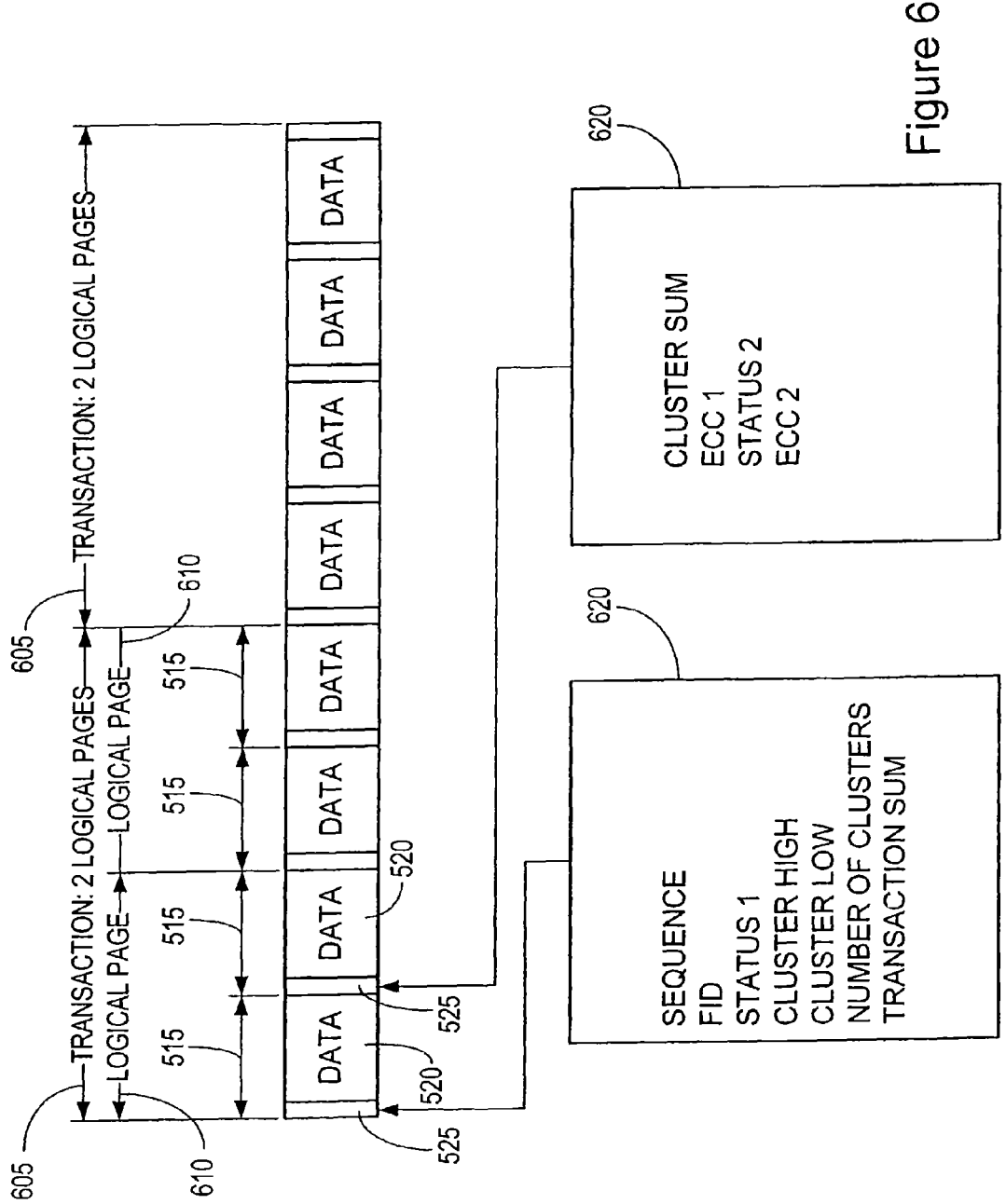
FIGS. 6 and 7 illustrate various manners in which transaction records may be arranged in flash media devices for use in the transaction based file system.

FIG. 6 illustrates one manner in which transaction records may be organized in a flash memory device, such as NAND flash device 505. In this example, each transaction record 605 is comprised of two or more contiguous logical pages 610. Each logical page 610, in turn, is comprised of two or more contiguous physical pages 515 of a block 510 of device 505. Meta-data information 620 for the transaction record 605 is stored in spare area 525, and may include some of the fields described in connection with header 430 of FIG. 4. Depending on the size of the spare area 525 of each page 515, the meta-data information may be divided among multiple spare areas 525 of the transaction record 605. A division of the meta-data information between the spare areas 525 of two consecutive physical pages 515 is shown in FIG. 6. The transaction records shown in FIG. 6 may also be organized so that each transaction 605 corresponds to a single logical page 610 that, in turn, is comprised of, for example, two contiguous physical pages 515.

Figure 7:
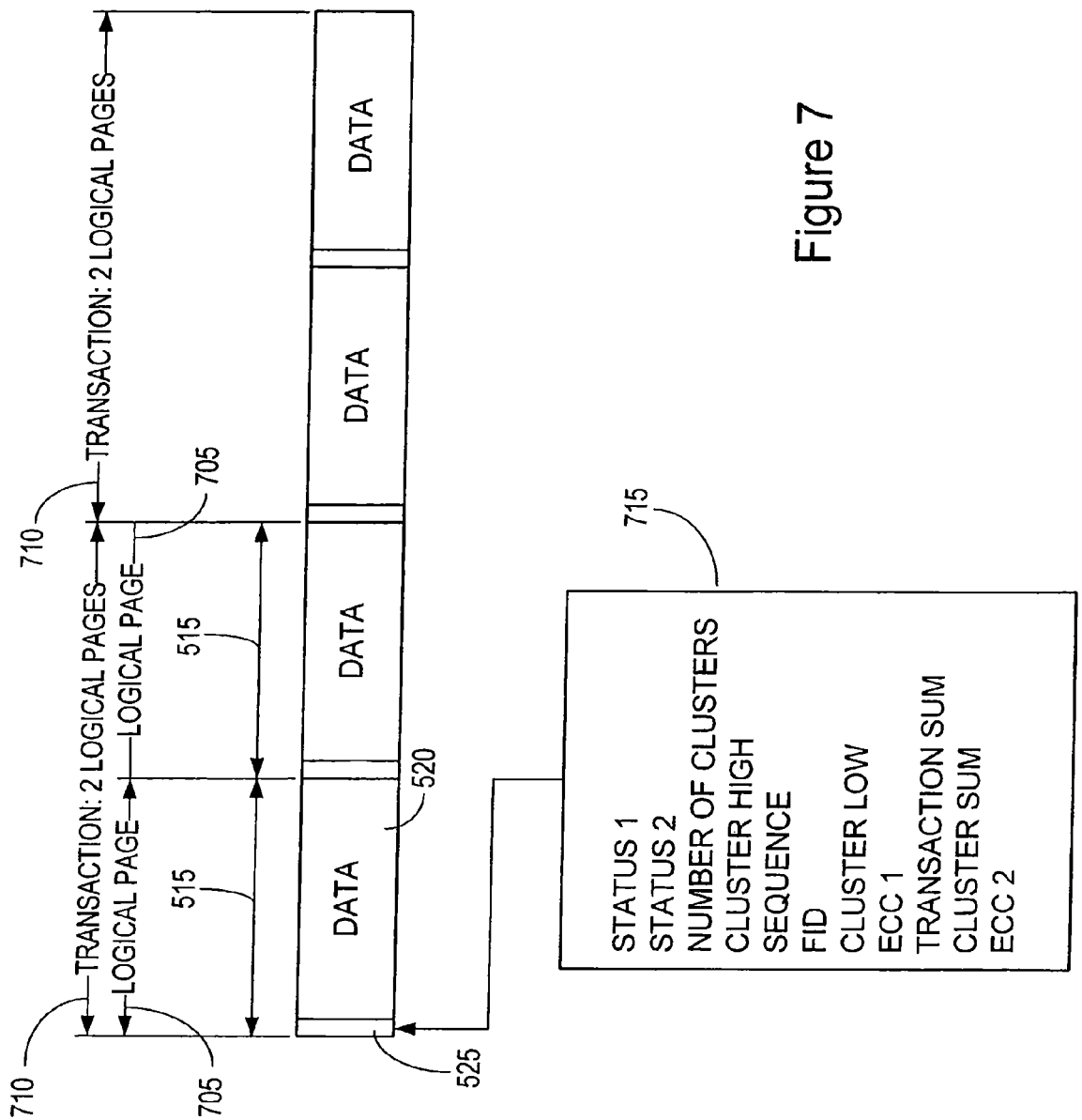

An alternative arrangement in which there is a one-to-one correspondence between each logical page 705 and a physical page 515 of flash device 505 is shown in FIG. 7. Another difference between this arrangement in the one shown in FIG. 6 is that all of the meta-data information 715 is stored in a single spare area 525 of the first physical page 515 of the transaction 710. Arrangements of this type are particularly suitable when large capacity flash devices are employed. However, the meta-data information 320 may also be divided between the spare areas 525 of the two contiguous physical pages 515 of the transaction record.

The sequence identifiers for the transaction records 710 stored in the same device block 515 may have the same values. In such instances, the sequence identifier provides chronological information that may be used to compare the time relationship between the transaction records of different device blocks. Chronological information on the transaction records 710 stored in the same block can be derived from the offset location of the transaction record 710 within the block 515, with later occurring transaction records 710 occurring at larger offsets.

After the computer system 100 has been started or powered on, the integrity of the file system may be verified by generating a reconstructed version of the file system in random access memory 35. The reconstructed file system, shown generally at 160 of FIG. 1, is generated using the valid, committed transactions stored in the transaction file 145 and from the file/directory information stored in metafile 300. In FIG. 1, the reconstructed file system 160 includes a regenerated file hierarchy 165 and an extents table 170.

Figure 8:
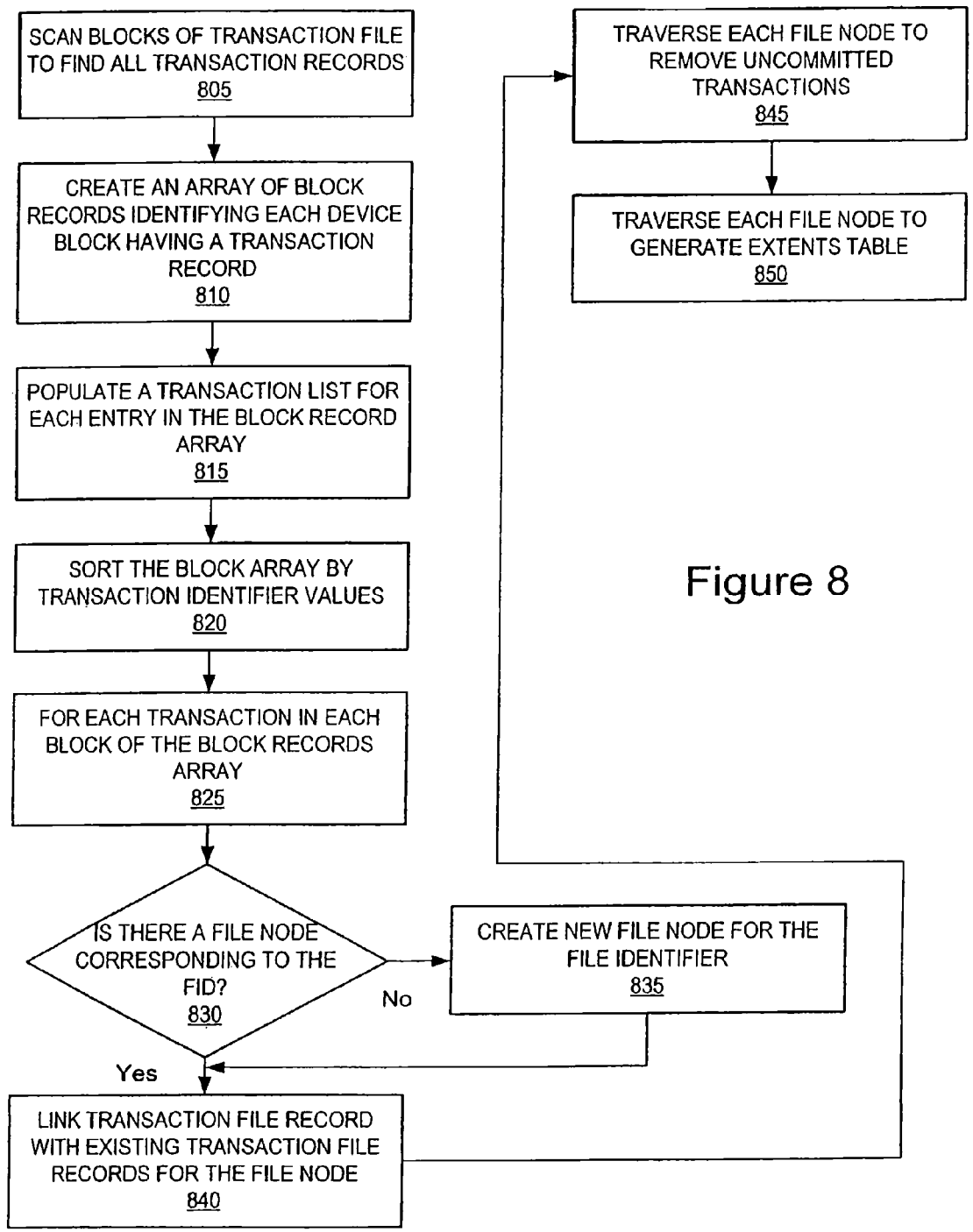
FIG. 8 illustrates a number of interrelated processing steps that may be used to generate an extents pool that, in turn, is employed in a reconstructed file system that is created by the computer system during startup.
Figure 9:
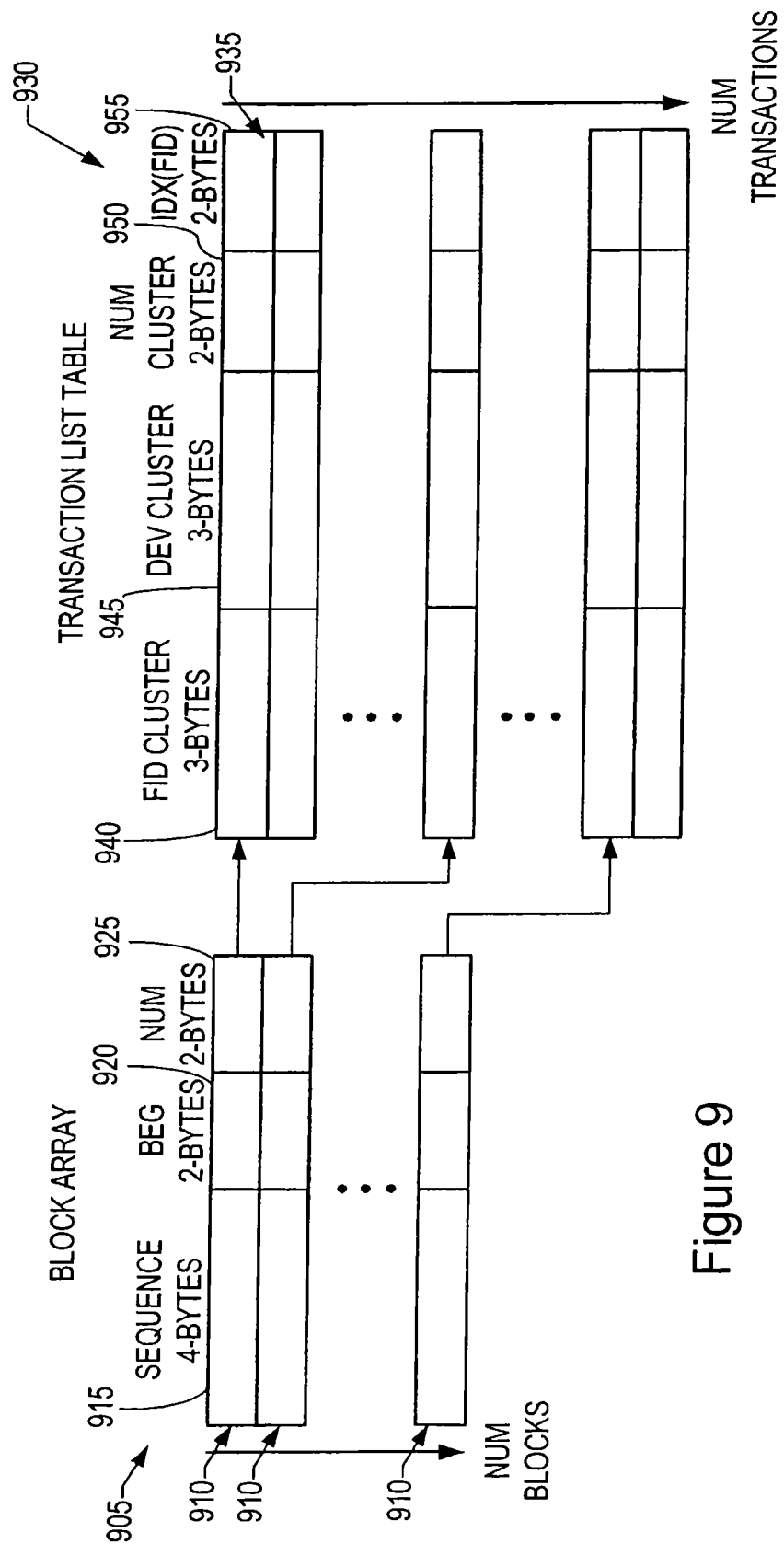
FIGS. 9 through 11 are directed to exemplary formats for various record types used in the processing steps shown in FIG. 8.
Figure 10:
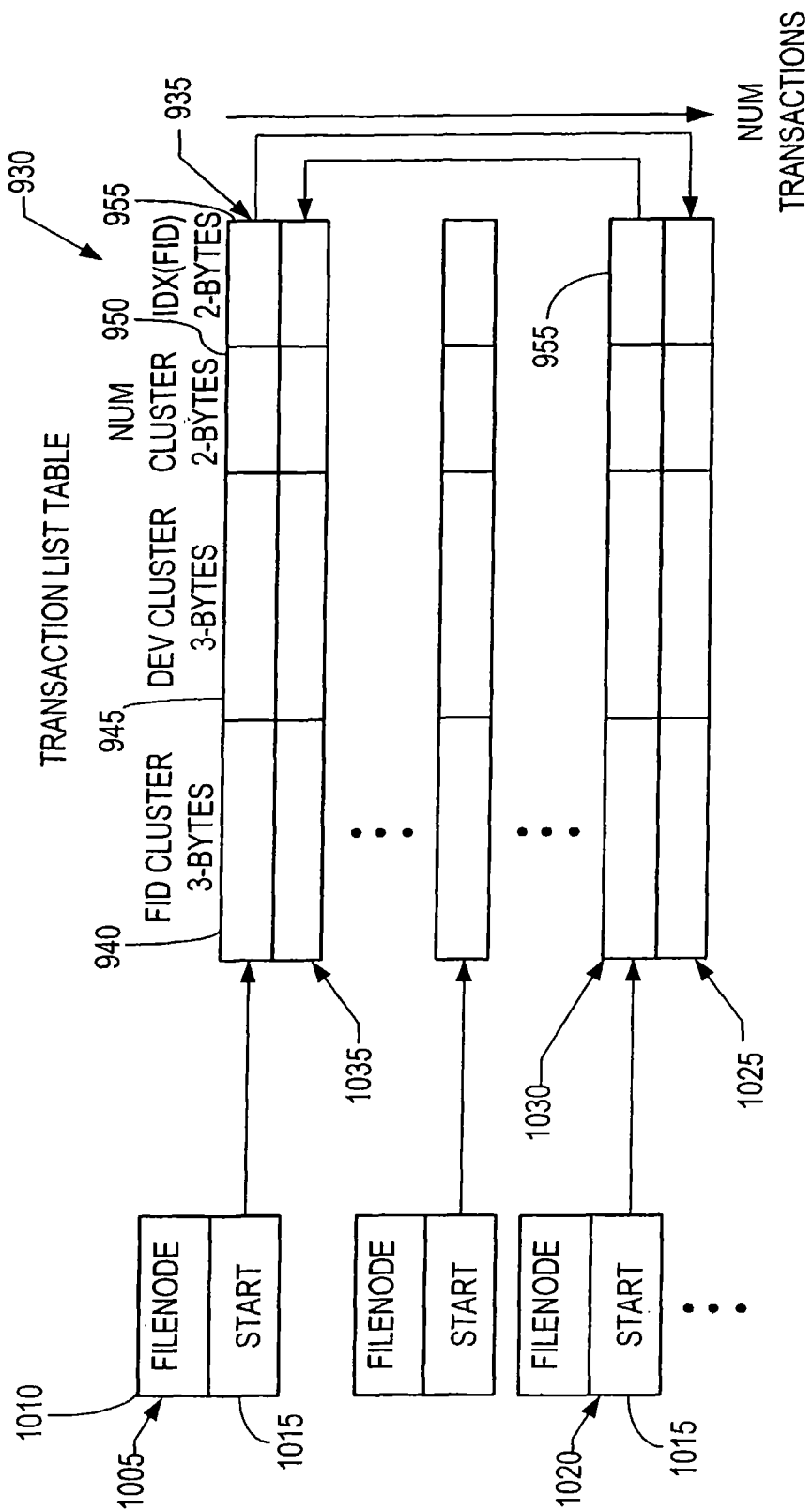
Figure 11:
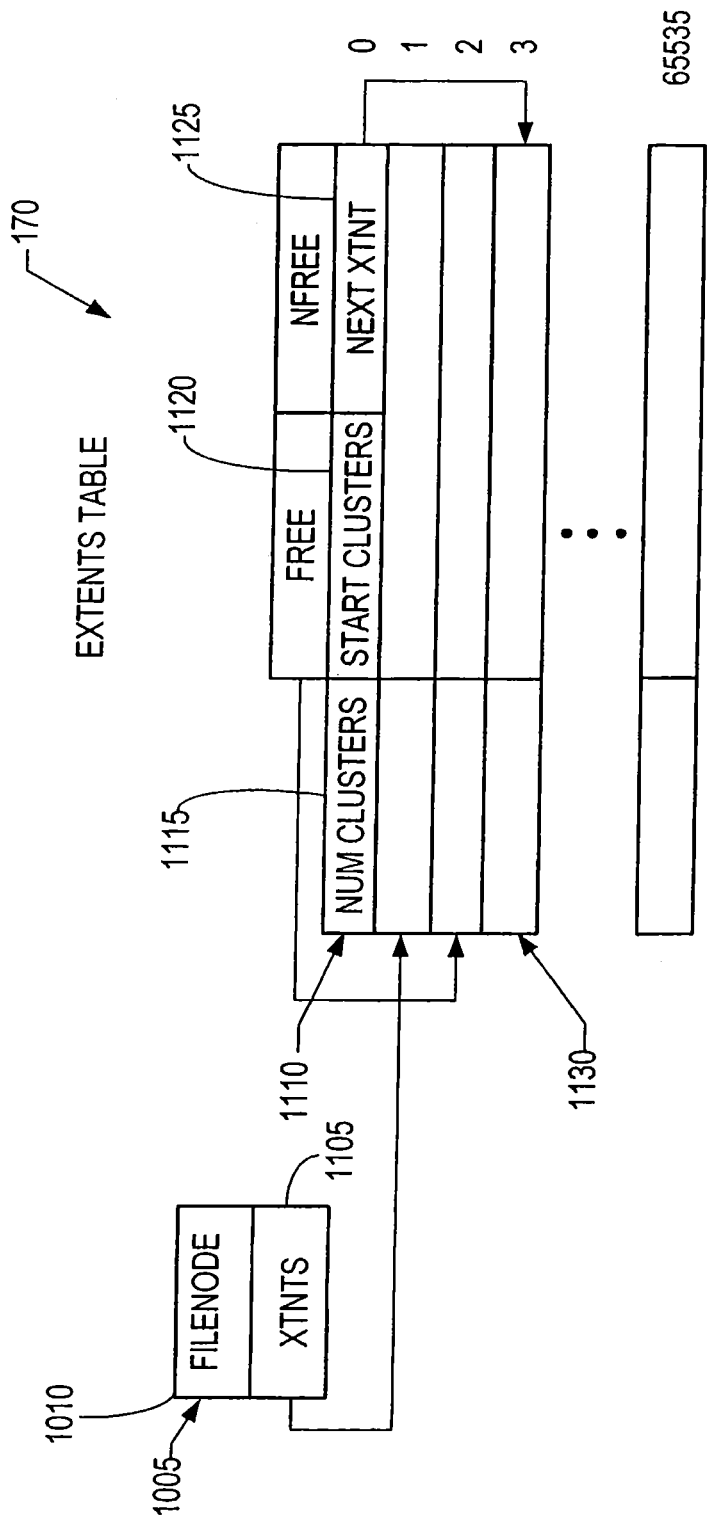

One manner of generating the extents table 170 is shown in FIGS. 8 through 11. FIG. 8 illustrates a number of interrelated processing steps that may be used to generate the extents table 170 while FIGS. 9 through 11 illustrate the logical organization of various tables and arrays generated and used in these operations.

Generation of the extents table 170 may commence at block 805 of FIG. 8 by scanning the blocks of the transaction file 145 to find all of the transaction records. The blocks may be scanned in sequence from the lowest ordered block to the highest ordered block in which a committed transaction record is found. As transactions are found within the blocks, an array of block records identifying each device block having a transaction record is generated at block 810.

As the file system software 140 scans the blocks of the transaction file 145 for transactions, the file system software may encounter a block that has been erased as a result of transactions that have been retired, or because the blocks have not yet been assigned for use in the file system. The transaction header may be structured so that there are no valid transactions that will have all of the bits of the header set to the erased value, typically a binary "1." As the file system software 140 scans the blocks of the transaction file 145, any transaction in which the header indicates an erased block may be skipped. This header invariant may be enforced by using a single bit as a flag to indicate the transaction is in use by the file system when it is the inverse of the erase value. Upon finding such an erase signature value in a transaction header, scanning of the remaining pages in the block is skipped thereby saving the time that would otherwise be used to access the erased pages. The overall system startup time is correspondingly decreased.

The organization of an exemplary block array 905 is shown in FIG. 9. Each block array record 360 includes a sequence field 915, a begin transaction field 920, and a number of transactions field 925. The sequence field 915 may be used to store the transaction identifier value for the transaction records stored in the block. The begin transaction field 920 may be used to store an index to the first transaction in the block and the number of transactions field 925 may be used to store the number of transactions found in the block.

At block 815 of FIG. 8, the file system software 140 populates a transaction list table for each record entry in the block array 905. FIG. 9 illustrates one manner in which the transaction list table 930 may be organized. In this example, each record 910 of the block array 905 points to at least one transaction list record 935 of the transaction list table 930. More particularly, a transaction list record 935 is generated for each transaction found in the block represented by a given block array record 905. The value stored in the number of transactions field 925 of the given block array record 910 corresponds to the number of transactions in the given block and designates how many records 935 for the given block will be added to transaction list table 930.

Each transaction list record 935 of the transaction list table 930 may have the same record length and include the same record fields. The exemplary fields used in records 935 of FIG. 9 include a file cluster offset field 940, a device cluster index field 945, a number of clusters field 950, and a file identifier/idx field 955. The file cluster offset field 940 may be used to identify the physical location of the transaction within the block. The device cluster index field 945 may be used to identify where the data for the transaction begins. The number of clusters field 950 may be used to identify how many clusters of data are present within the transaction. Finally, the file identifier/idx field 955, as will be set forth below, is multipurpose. Initially, however, the value stored in the file identifier/idx field 955 may be used to identify the file to which the transaction applies. The file identifier value stored in field 955 may directly correspond to the file identifier used to reference the record in metafile 300. Upon the completion of block 815, the records 910 of block array 905 will be arranged, for example, in increasing block order, while the records 935 for each block array record 910 will be arranged in increasing page order.

At block 820, the records 910 of block array 905 are sorted based on the values stored in the sequence fields 915. This operation is performed to place the records 935 of the transaction list table 930 in chronological order (i.e., the order in which the corresponding transactions are to be applied to the files of the file system).

A temporary file 175 storing file node information corresponding to the transaction records of the file system then may be generated in RAM 120 using the sorted records of block array 905 and transaction list table 930. To this end, a basic record corresponding to the root directory of the file system is added to temporary file 175. The information used to generate the root directory node in temporary file 175 may be obtained from the record corresponding to the root directory file stored in metafile 300.

A logical representation of one manner of arranging the file node records in temporary file 175 is shown generally at 445 of FIG. 10. In this example, each file node record 1005 includes a file node field 1010 and a start field 1015. The contents of the file node field 1005 is used to identify the file node to which various transaction records 935 of the transaction list table 930 are linked. For the sake of simplicity, the contents of the file node field 1005 may have the same format as the file identifiers used to access the corresponding record entries 305 of metafile 300. The contents of the start field 1015 may be used to identify the location of the first transaction record 935 in transaction list table 930 that corresponds to the file identified in the file node field 1010. As such, each file node record 1005 identifies a file within the file system as well as the location of the first transaction relating to the identified file.

At block 825, each of the sorted records 910 and 935 of the block array 905 and transaction list table 930 are traversed to determine whether or not the temporary file 175 includes a file node record 1005 corresponding to the file identifier stored in file identifier/idx field 1005. If a file node record 1005 with the same file identifier as the transaction record 935 is not found in the temporary file 175, a new file node record 1005 is created at block 835. Once a file node record 1005 corresponding to the transaction list record 935 exists in temporary file 175, the transaction list record 935 may be linked into a list of transactions for the file node record 1005. In this example, the transaction list record 935 is linked into the list of transactions for the file node record 1005 at block 840 of FIG. 8.

The manner in which a transaction list record 935 is linked into the list of transactions for the file node may depend on whether the transaction list record 935 is the first transaction list record of the file node or a subsequent transaction list record for the file node. If it is the first transaction list record of the file node, the start field 1015 of the file node record 1005 is updated to identify the starting location of this first transaction list record 935. As such, the contents of the start field 1015 of the file node record 1005 may be used to point to a location in the transaction list table 930 that, in turn, contains extent information for the first transaction applied to the file. The function of the file identifier/idx field 955 changes when the transaction list record 935 is to be appended to existing transaction list records for the file node (i.e., when it is not the first transaction list record for the file node). More particularly, the value and the function of the field 955 is changed so that it points to the last transaction record 935 associated with the file node. This is illustrated in FIG. 10, where the start field 1015 of file node record 1005 points to the beginning of transaction list record 935. The file identifier/idx field 955 of record 935, in turn, points to the beginning of transaction list record 1025, which contains the information on the location of the second transaction for the file represented by the file node record 1005. Similarly, the start field 1015 of file node record 1020 points to the beginning of transaction list record 1030. The file identifier/idx field 955 of transaction list record 1030 points to the beginning of transaction list record 1035, which contains the information on the location of the second transaction for the file represented by the file node record 1020.

Once all of the transaction list records of the transaction list table 930 have been linked in the proper manner with the corresponding file node records, the transaction list records for each file node are traversed at block 845 to remove any transaction list records that reference uncommitted and/or bad file transactions. Removal of such transaction list records may be accomplished in a variety of different manners. For example, the file system software 140 may check the status field of the last occurring transaction to determine whether or not it was committed. If the transaction has been committed, the corresponding record in the transaction list table 930 is left undisturbed. If the transaction has not been committed, however, the corresponding record in the transaction list table 930 is removed or otherwise ignored.

To expedite this type of transaction commitment checking, the file system software 140 only needs to ensure that the last occurring transaction has been committed. Commitment checking of all other records may be skipped since only the last occurring transaction is impacted by a power failure, improper system shutdown, or the like. By skipping commitment checking of all other records, the time required for system startup may be substantially reduced.

Although it is shown as part of a linear sequence, block 845 may be executed as each transaction list record is processed for incorporation in the corresponding file node. For example, file system software 140 may check the status information included in the header of each transaction record to determine whether the transaction has been committed. This check may occur as each transaction record is used to populate the corresponding transaction list record. Once the file system software 140 finds a transaction that has not been committed, no further processing of the transaction list table 930 in blocks 825 through 845 of FIG. 8 is necessary.

At block 850, entries are generated in extents table 170 for each of the file nodes. One manner in which this may be accomplished is shown in FIG. 11. In this example, the content of the start field 1015 of each file node may be changed so that it now operates as an extents index field 1105. The extents index field 1105 points to the first location in the extents table 170 containing information on the location of the transaction data for the first transaction for the file. Each extents record 1110 may include a number of clusters field 1115, a start cluster field 1120, and a next extent field 1125. The start cluster field 1120 identifies the starting location in memory storage 115 where the first file transaction for the file corresponding to the file node is stored. The number of clusters field 1115 identifies how many contiguous clusters of memory storage 115 are used to store the file transaction. The next extents field 1125 identifies the extents index of the next extents record for the file represented by the file node. In this example, extents index 1105 points to extents record 1110 while the next extents field 1125 of extents record 1110 points to extents record 1130.

The data used to populate the records of the extents table 170 may be derived, at least in part, from the data stored in the transaction list table entries 930. In the example shown here, the extents table 170 is a more compact form of the transaction list table 930. To this end, file system software 140 may combine transaction list records having contiguous data into a single extents record entry if the transaction list records are part of the same file node. Similarly, there is no further need to maintain the block array 905 in RAM 120. Therefore, block array 905 may be discarded from RAM 120, if desired.

The integrity of the transactions in the transaction file 145 may be checked during the execution of the various steps used to generate extents table 170. For example, integrity checking of the transaction records may be executed during either steps 810 or 815 of FIG. 8. Common data checks include CRC and ECC techniques.

To decrease the startup time of the computer system 100, error checking techniques may be limited to the information included in the header for certain transactions. As transactions are found during the startup process shown in FIG. 8, the file system software 140 may identify whether the transaction impacts file data or metadata, such as directory structure information in metafile 300. This distinction may be based on the file identifier associated with the transaction. Normally, metadata will be represented by file identifiers that are well-known and hard coded into the file system software 140 (e.g., they will identify the metafile 300 as the file that is the subject of the transaction). Since only the metadata is required to ensure that the files system is in a consistent state after startup, data checking techniques on the data portion of the transaction are only performed when the transaction relates to such metadata. If the transaction does not relate to a change of the metadata, data checking techniques may be initially limited solely to the checking of the header information. In the transaction record format shown in FIG. 6, the principal header information that must be verified on system startup is stored in the first spare area 525 of each transaction record 605. This allows the file system software 140 to skip verification of the header information included in the second spare area of each transaction record 605 thereby further optimizing the startup sequence. As will be explained in further detail below, error checking of the data portion of each transaction may be deferred until the time that the corresponding file is first accessed by the file system software 140 after completion of the startup sequence.

Any startup verification of the transaction records may be further optimized by limiting error checking solely to the first transaction header of a series of sequential transactions. During startup scanning of the transaction file 145, when a transaction header is found that indicates that a number of sequential transaction records for the same file follow, verification of the headers of the trailing transactions in the sequence may be skipped once the header for the first transaction record of the sequence has been verified. Scanning and verification of header information may then resume with the next block following the last of the trailing transactions.

Figure 12:
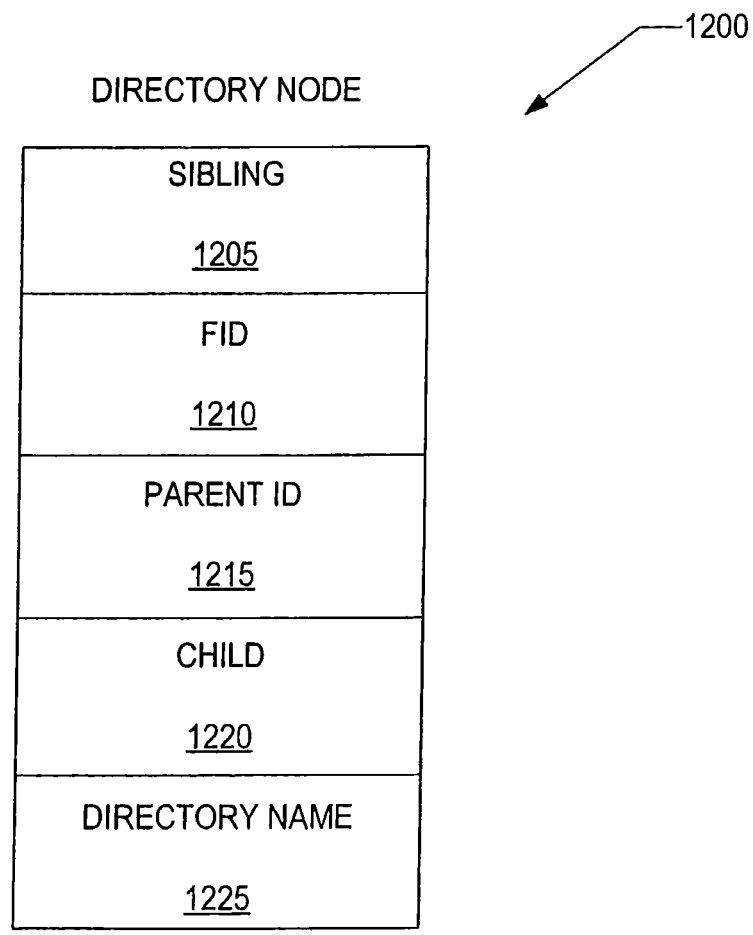
FIG. 12 is directed to an exemplary format for a directory node record of the regenerated file hierarchy used in the reconstructed file system.
Figure 13:
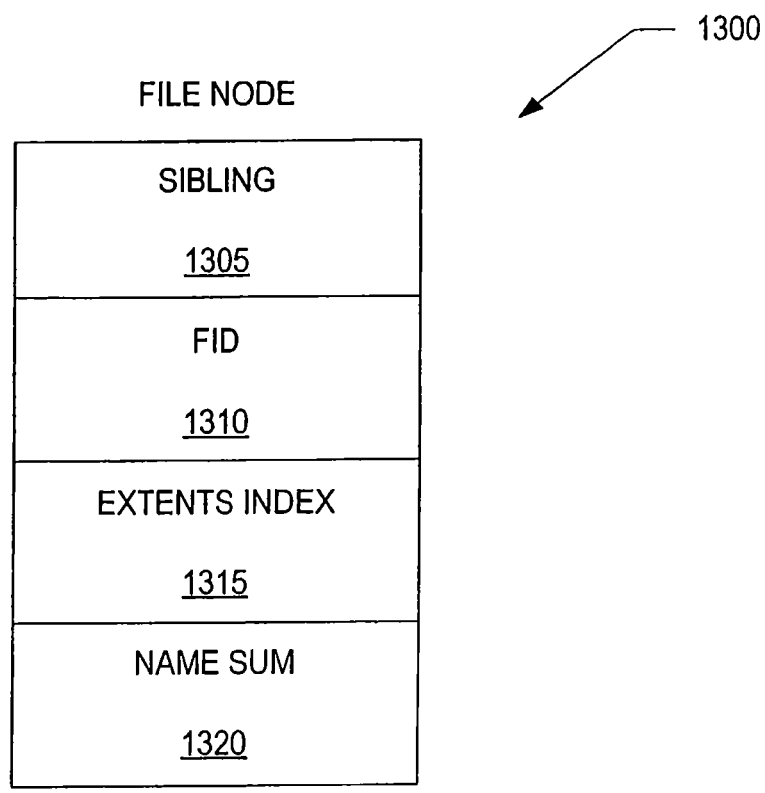
FIG. 13 is directed to an exemplary format for a file node record of the regenerated file hierarchy used in the reconstructed file system.

The next broad step in generating the reconstructed file system 160 in RAM 120 is the construction of the regenerated file hierarchy 165. In this example, the regenerated file hierarchy 165 is comprised of both file and directory node records. An exemplary format for a directory node record is shown generally at 1200 of FIG. 12 while a corresponding exemplary format for a file node record is shown generally at 1300 of FIG. 13.

Directory node record 1200 includes a number of different fields that are used by the file system software 140. More particularly, directory node record 1200 may include a sibling field 1205, a file identifier field 1210, a parent identifier field 1215, a child field 1220 and a directory named field 1225. Similarly, file node record 1300 of FIG. 13 includes a number of different fields that are used by the file system software 140. The file node record fields may include a sibling field 1305, a file identifier field 1310, an extents index field 1315, and a name sum field 1320.

Since the data contained in the records of metafile 300 is used in the construction of the regenerated file hierarchy 165, the manner in which the metafile records are arranged in the metafile 300 will have an impact on the system startup performance. To this end, the records of metafile 300 may be arranged in a single metafile as contiguous records having the same length and are all stored in the same storage media. This arrangement enhances the speed with which the file system software 140 may access the metafile data and reduces the amount of processing that is required for such access.

Figure 14:
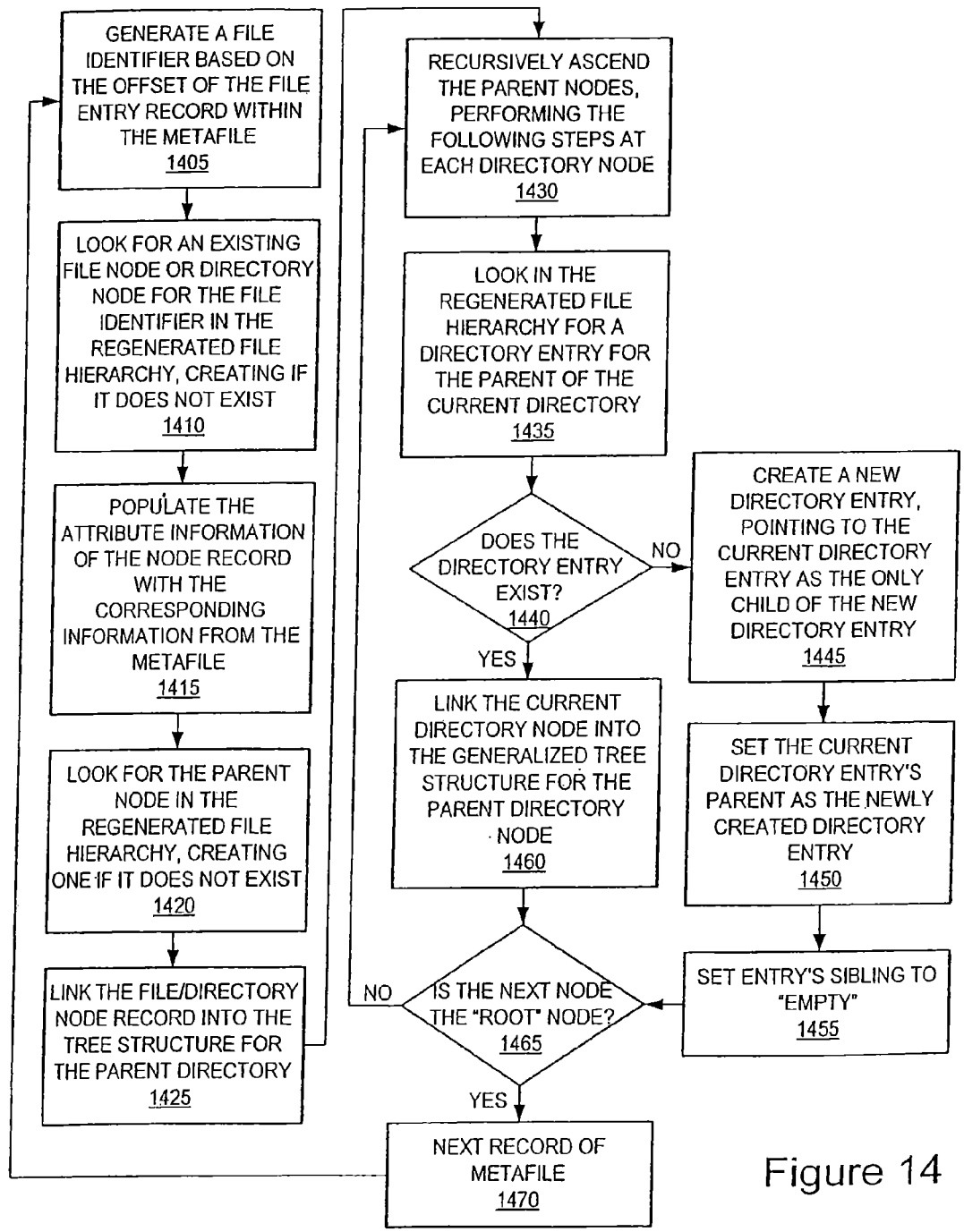
FIG. 14 illustrates a number of interrelated processing steps that may be used to construct the regenerated file hierarchy used in the reconstructed file system.

One sequence of steps that may be used to populate the fields for each file node record 1300 and directory node record 1200 of the regenerated file hierarchy 165 is shown in FIG. 14. The illustrated sequence is executed for each record in metafile 300 and may start at block 1405. At block 1405, a file identifier is generated based on the offset of the first record entry within the metafile 300. A check of the regenerated file hierarchy 165 is made at block 1410 to determine whether a file node record 1300 or directory node record 1200 corresponding to the file identifier is already present. If a corresponding record 1300 or 1200 is not present, a new record file is created in the regenerated file hierarchy 165. The format of the newly created record depends on whether the file identifier corresponds to a file entry or directory entry in metafile 300. The file system software 140 will make this determination and apply the proper record format 1200 or 1300.

At block 1415, the fields for the newly created record are populated using the attributes for the file/directory that are found in the metafile 300. If the newly created record corresponds to a directory node, the parent identifier field 1215 and directory name field 1225 are populated using the data in the parent file identifier and short name fields of the corresponding record in metafile 300. If the newly created record corresponds to a file node, the name sum field 1320 may be populated using data that is directly stored or derived from the file name data of the corresponding record in metafile 300. The extents index field 1315 is populated using the data found in the extents index field 11 of 5 of the corresponding file node record 1005 (see FIG. 11).

If the newly created file corresponds to a directory node, a search through the regenerated file hierarchy 165 is undertaken at block 1420 to determine whether the parent node exists. If the parent node does not exist, a directory record corresponding to the parent node is added to the regenerated file hierarchy 165.

At block 1425, the newly generated file/directory record is linked into the tree structure for the parent directory node. If the child field 1220 of the newly generated file/directory record indicates that the parent directory has no children, the value of the child field 1220 of the parent directory record is reset to point to the newly generated file/directory record and the sibling field 1205 or 1305 of the newly generated file/directory record is set to indicate that the newly generated file/directory record does not have any siblings. If the child field 1220 of the parent node record indicates that the parent directory node has children, the sibling field 1205 or 1305 of the newly generated file/directory record is set to point to the existing child of the parent directory and the child field 1205 of the parent directory is set to point to the newly generated file/directory record. If the newly generated file/directory record corresponds to a directory node, the parent identifier field 1215 of the newly generated directory record is set to point to the parent directory node.

At block 1430, the file system software 140 recursively ascends the parent nodes, beginning with the parent directory of the newly generated file/directory record, and executes a series of processing steps until the root node is reached. At this point, the parent directory node of the newly generated file/directory record may be referred to as the current directory node. In the exemplary process shown in FIG. 14, the file system software 140 checks the regenerated file hierarchy 165 to determine whether a directory node record corresponding to the parent node of the current directory exists. This process is executed at steps 1435 and 1440. If such a directory record does not exist in the regenerated file hierarchy 165, a new directory record is generated at block 1445. The child field 1220 of the newly generated directory record is then set to point to the current directory node record as the only child of the new directory record. At block 1450, the parent identifier field 1215 of the current directory node record is set to point to the newly generated directory record. The sibling field 1205 of the current directory node record is set to indicate that there are no siblings for the current directory node record at block 1455.

If the check executed at steps 1435 and 1440 indicate that there is a directory record in the regenerated file hierarchy 165 that corresponds to parent node of the current directory, then the current directory node is linked into the generalized tree structure of the parent directory node at step 1460. To this end, the parent identifier field 1215 of the current node is set to point to the location of the parent node record in the regenerated file hierarchy 165. The sibling field 1205 of the current directory node is set to point to the same record as pointed to by the child field 1220 of the parent node record. Finally, the child field 1220 of the parent directory node is set to point to the location of the current directory node.

At block 1465, the file system software 140 checks to determine whether the recursive directory processing is completed. In this example, the recursive directory processing is completed when the processing ascends to the root node, which has a unique and recognizable file identifier. If the root node has been reached at block 1465, processing of the next file record entry in metafile 300 is begun at block 1470, which returns control of the processing back to step 1405. If the root node has not been reached at step 635, then processing of the next parent node in the ascending file/directory hierarchy is repeated beginning at block 1430.

Figure 15:
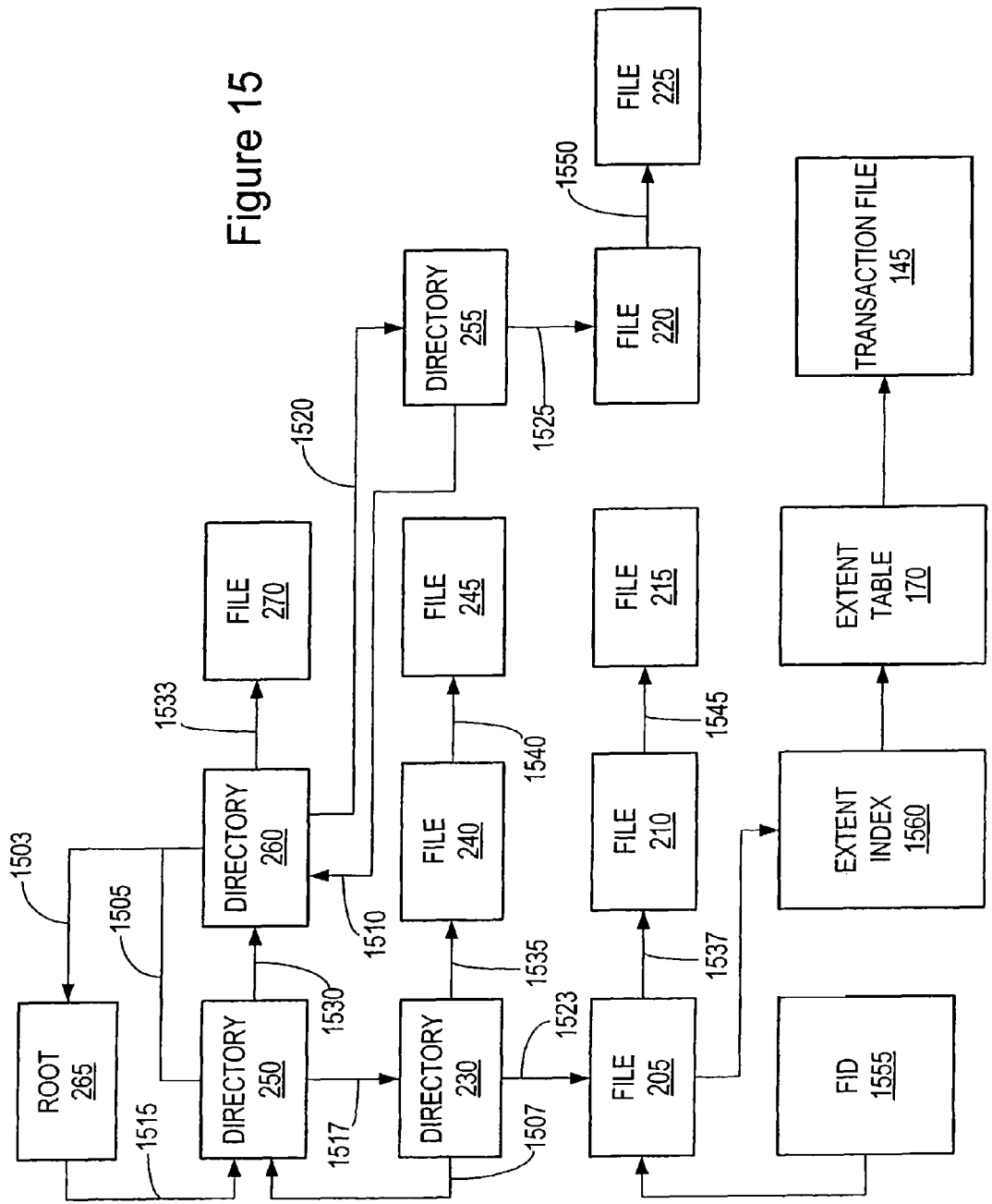
FIG. 15 is a logical representation of a reconstructed file system that has been generated in the manner set forth in connection with FIGS. 8 through 14 as applied to the exemplary file and directory arrangement shown in FIG. 2.

FIG. 15 is a logical representation of the reconstructed file system 160 and corresponds to the application of the processing steps of FIGS. 8 and 14 to a file system having the file hierarchy shown in FIG. 2. In this exemplary representation, lines 1503, 1505, 1507, and 1510 represent pointers that correspond to the content of the parent identifier fields 1215 for the directory node records representing directories 260, 250, 230, and 255, respectively. Lines 1515, 1517, 1520, 1523, and 1525 represent pointers that correspond to the content of the child identifier fields 1220 for the directory node records representing directories 265, 250, 260, 230, and 255, respectively. Lines 1530, 1533, 1535, and 1537 represent pointers that correspond to the content of the sibling identifier fields 1205 for the directory node records corresponding directories 250, 260 and 230, respectively. Lines 1540, 1545, and 1550 represent pointers that correspond to the content of the sibling identifier fields 1305 for the file node records corresponding to files 240, 205, 210, and 220, respectively.

One manner of accessing data in the transaction file 145 of memory storage 115 using the reconstructed file system 160 is also illustrated in FIG. 15. As shown, the file system software 140 provides a file identifier 1555 for the file node record that the software is to access. In this example, the file identifier 1555 points to the file node record representing file 205. The file system software 140 then uses the contents of the extents index 1560 of the file node record as an index into extents table 170 to locate the data for the file in the transaction file 145. It will be recognized, however, that the file system software 140 may use the contents of the reconstructed file system 160 in a variety of different manners other than the one illustrated in FIG. 15.

As noted above, complete verification of the integrity of a file need not be performed during startup so that startup processing may be expedited. Instead, the file system software 140 may defer complete verification or verification of previously unverified portions of a transaction record corresponding to a given file until the first or subsequent time that the given file is accessed. To this end, the file system software 140 may maintain a table indicating whether or not the integrity of each transaction file record for a given file has been completely verified. Alternatively, the file system software 140 may use one or more bits of each file node record in the regenerated file hierarchy 335 to indicate whether the integrity of the transaction records for the file have been completely verified. This file verification indicator is checked by the file system software 140 the first time (or a subsequent time) that a file is accessed after the file system startup process has been completed. If the indicator shows that the transaction records of the file have not been completely verified, a verification of the transaction file records may be executed at that time. To expedite the verification process, verification of the transaction file records may be limited to the particular sections of the records that were not previously verified. For example, since the headers of most of the transaction records for the file already may have been checked during the file system startup process, the file system software need only verify the integrity of the data portions of each transaction record for the file. The verification processes may include one or more CRC processes, one or more ECC processes, etc. As shown in FIGS. 5, 6 and 7, a number of different fields in each of the transaction record headers may be dedicated to verifying the integrity of the transaction record. If the integrity checks fail and an application using the relevant error-correcting codes cannot correct the error, then a program error is reported back to the application or system that made the request to access the file contents. Once all of the transaction records for a file have been completely verified, the file system software 140 may change the verification indicator for the file accordingly.

As updates are made to the existing contents of files and directories within the file system, there may be an increasing number of transaction records directed to the same file and/or the same logical region of a given file. An increasing number of transaction records also may be directed to the same directory as reflected by transaction records affecting a particular region of metafile 300. This file system overhead may be avoided if the transaction records relating to the same directory, file and/or logical region of a given file are coalesced into a reduced number of replacement transaction records (e.g., a single transaction record). Transaction record coalescing may be executed during the file system startup process as well as during subsequent operation of the file system. It is particularly well-suited for execution when the computer system 100 is not actively accessing the memory storage 115. For example, coalescing operations may be performed when the computer system 100 is generally idle.

Figure 16:
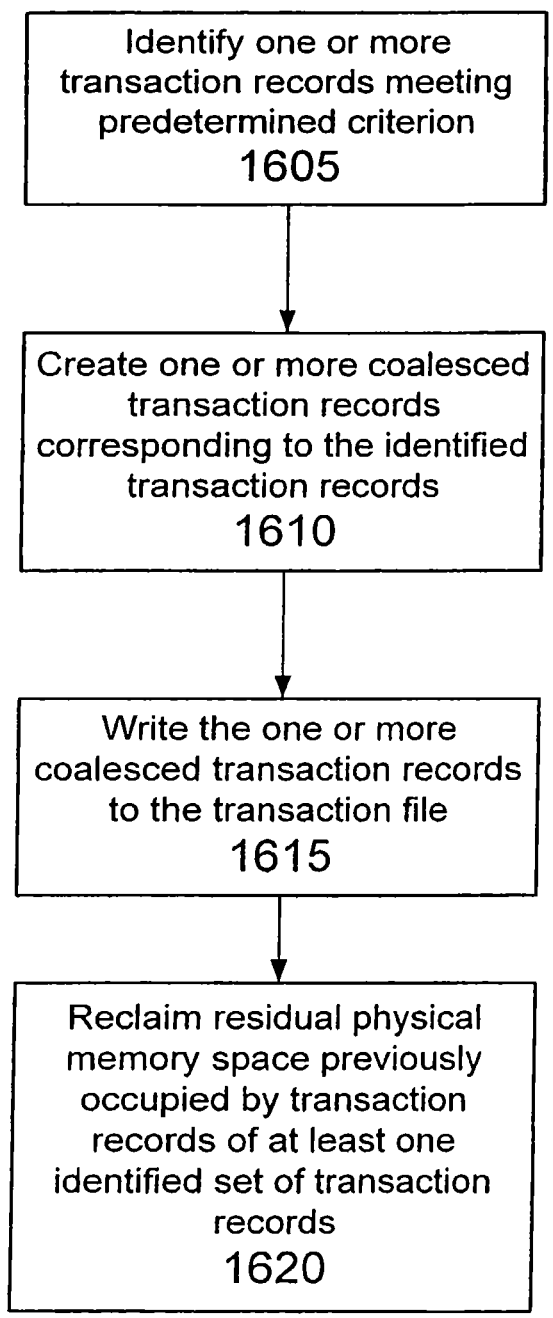
FIG. 16 illustrates a number of interrelated processing steps that may be used to coalesce transaction records meeting predetermined criterion.

One way to coalesce transaction records affecting the same file or directory is shown in FIG. 16. At block 1605, the file system software 140 may scan the transaction file 145 to identify all transaction records that meet a predetermined criteria, such as all transaction records that generally affect the same file or directory. The file or directory affected by the transaction record may be defined or derived from the file identifier, an address offset, or the like. Other criteria also may be used to identify one or more transaction records for coalescing. In one implementation, the file system may scan the header section of each transaction record in the transaction file 145 to determine whether the predetermined criteria are met. Transaction records meeting the predetermined criteria may be grouped into individual transaction record sets, where each transaction record set affects, for example, an individual file and/or directory of the file system. Each transaction record set may then be subsequently coalesced. Alternatively, or additionally, the file system 140 may generate a transaction record set in which the transaction records affecting the same logical space of a file are grouped for subsequent coalescing.

The newly created transaction record set(s) may take on any number of different forms. For example, the newly created transaction record set may be in the form of pointers to the logical locations of the individual transaction records in transaction file 145. Similarly, the newly created transaction record set may be in the form of individual transaction records that substantially correspond to the format of the original transaction records in transaction file 145.

The transaction records in the transaction record set may be combined into one or more coalesced transaction records at block 1610. For example, the transaction records in the transaction record set that affect a given file or portion of a given file may be sequentially applied in chronological order to generate the coalesced transaction record(s). Alternatively, or additionally, other methods may be used to combine transaction records in the set. In each instance, the predetermined criterion used at block 1610 to generate the transaction record set is selected to ensure that the state/content of a file or directory is the same irrespective of whether the file system software 140 applies the original transaction records in the transaction file 145 or the corresponding coalesced transaction record(s).

Several other operations also may be executed at block 1610. For example, a transaction identifier may be assigned by the file system software 140 to each coalesced transaction record. The transaction identifier may identify the coalesced transaction record as the last transaction record that affects the given directory, a given file, or portion of the given file.

Coalesced transaction records generated at block 1610 may be written to the transaction file 145 at block 1615. Once a coalesced transaction(s) has been written to the transaction file 145 and committed, the file system software 140 may reclaim the residual physical memory space previously occupied by the transaction records of the corresponding transaction record set. Reclamation of the physical memory is shown at block 1620. Generally, the amount of physical memory required to store the coalesced transaction record(s) of a transaction record set will be less than the amount of physical memory required to store the original transaction records corresponding to the transaction record set. Consequently, a net gain of physical memory may be achieved by coalescing the transaction records in this manner. The physical memory reclaimed in this matter may be used, for example, to store further transaction records. Alternatively, or in addition, if the reclaimed memory includes memory block(s) that are exhausted through use (i.e., as in the case of flash-like memory), the exhausted memory block(s) may be marked for retirement to prevent further access to them.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. An electronic data system comprising:
    a memory comprising stored data;
    a file system code executable to organize and maintain the stored data in a plurality of files and a plurality of directories;
    a transaction file maintained by the file system code in the memory, the transaction file comprising a plurality of transaction records stored on the memory, where the transaction records correspond to a plurality of transactions on at least one of the files and the directories, where each transaction record of the transaction records comprises a header section and a data section, where the header section of each respective one of the transaction records identifies at least one of a file and a directory associated with the data section of the respective one of the transaction records, and the file and the directory are included in at the least one of the files and the directories; and
    where the file system code coalesces the transaction records stored on the memory by:
    scanning the header section of each transaction record of the transaction records for identification of a first subset of the transaction records directed to a same file, a second subset of the transaction records directed to a same logical portion of one of the files, and a third subset of the transaction records directed to a same directory; and at least one of:
    combining the first subset of the transaction records identified during the scanning as directed to the same file into one or more first coalesced transaction records and releasing one or more transaction records of the first subset of the transaction records identified as directed to the same file as free memory thereby reducing an amount of the memory used by the transaction file,
    combining the second subset of the transaction records identified during the scanning as directed to the same logical portion of the file into one or more second coalesced transaction records and releasing one or more transaction records of the second subset of the transaction records identified as directed to the same logical portion of the file as free memory thereby reducing the amount of the memory used by the transaction file, and
    combining the third subset of the transaction records identified during the scanning as directed to the same directory into one or more third coalesced transaction records and releasing one or more transaction records of the third subset of the transaction records identified as directed to the same directory as free memory thereby reducing the amount of the memory used by the transaction file;
    where the header section of each respective one of the transaction records further comprises a first field from which the file system code determines a starting address at which the data section is to be written into the at least one of the file and the directory identified in the header section, and a second field from which the file system code determines an amount of the at least one of the file and the directory that is to be overwritten.

2. The electronic data system of claim 1 where the file system code is executable to assign one or more transaction identifiers to the one or more first coalesced transaction records, the one or more second coalesced transaction records and the one or more third coalesced transaction records.

3. The electronic data system of claim 1 where the file system code further coalesces the transaction records stored on the memory by:
    generating a first transaction record set comprising the first subset of the transaction records directed to the same file,
    generating a second transaction record set comprising the second subset of the transaction records directed to the same logical portion of the file, and
    generating a third transaction record set comprising the third subset of the transaction records directed to the same directory pursuant to coalescing the transaction records.

4. The electronic data system of claim 3 where the first, the second, and the third transaction record sets comprise a plurality of pointers to a plurality of locations in the transaction file of the first, the second, and the third subset of the transaction records, respectively.

5. The electronic data system of claim 3 where the first, the second, and the third transaction record sets are formatted in a same manner as a manner in which a corresponding transaction record of the transaction records is formatted in the transaction file.

6. The electronic data system of claim 3 where the file system code is further executable to:
- apply, pursuant to generating the first transaction record set, the first subset of the transaction records directed to the same file in a first chronological sequence corresponding to a first time order in which each transaction record of the first subset of the transaction records directed to the same file originally occurred;
- apply, pursuant to generating the second transaction record set, the second subset of the transaction records directed to the same logical portion of a file in a second chronological sequence corresponding to a second time order in which each transaction record of the second subset of the transaction records directed to the same logical portion of the file occurred; and
- apply, pursuant to generating the third transaction record set, the third subset of the transaction records directed to the same directory in a third chronological sequence corresponding to a third time order in which each transaction record of the second subset of the transaction records directed to the same directory occurred.

7. The electronic data system of claim 3 where file system code is executable to:
- combine the transaction records of the first transaction record set to reduce a first number of transaction records directed to the same file;
- combine the transaction records of the second transaction record set to reduce a second number of transaction records directed to the same logical portion of a file; and
- combine the transaction records of the third transaction record set to reduce a third number of transaction records directed to the same directory.

8. The electronic data system of claim 1 where the file system code is executable to reclaim a residual physical storage space that results from coalescing the transaction records for use in storing additional transaction records.

9. The electronic data system of claim 1 where each header section of each transaction record of the transaction records further comprises a status field which is indicative of whether each transaction record of the transaction records has been committed.

10. A method comprising:
- providing a plurality of files and a plurality of directories stored on a memory device;
- providing, on the memory device, a transaction file comprising a plurality of transaction records, where each respective one of the transaction records comprises a header section and a data section, where the header section of each respective one of the transaction records identifies at least one of the files and the directories that is associated with the data section of the respective one of the transaction records, and the header section further comprises a first field indicating a starting address at which the data section is to be written into the at least one of the files and the directories, and a second field indicating an amount of the at least one of the files and the directories that is to be overwritten;
- coalescing the transaction records stored on the memory device with a processor by:
- scanning the header section of each of the transaction records for identification of a first subset of the transaction records directed to a common file;
- scanning the first field and the second field of the header section of each respective transaction record in the first subset for identification of a second subset of transaction records directed to an overlapping portion of the common file, wherein the overlapping portion is a common portion of the common file and at least a part of the overlapping portion is to be overwritten when each respective transaction record in the second subset is applied;
- combining the second subset of transaction records into one or more first coalesced transaction records and including the one or more first coalesced transaction records in the first subset of transaction records;
- releasing the second subset of the transaction records for a first reduction in an amount of memory used by the transaction file;
- combining the first subset of the transaction records identified as directed to the common file, including the one or more first coalesced transaction records, into one or more second coalesced transaction records; and
- releasing one or more transaction records of the first subset of the transaction records identified as directed to the common file for a second reduction in the amount of memory used by the transaction file.

11. The method of claim 10, wherein coalescing further comprises:
- scanning the header section of each of the transaction records for identification of a third subset of the transaction records directed to a common logical portion of one of the files;
- combining the third subset of the transaction records identified during the scanning as directed to the common logical portion of the one of the files into one or more third coalesced transaction records; and
- releasing one or more transaction records of the third subset of the transaction records identified as directed to the common logical portion of the file for a further reduction in the amount of memory used by the transaction file.

12. The method of claim 10, wherein coalescing further comprises:
- scanning the header section of each of the transaction records for identification of a third subset of the transaction records directed to a common directory;
- combining the third subset of the transaction records identified during the scanning as directed to the common directory into one or more third coalesced transaction records; and
- releasing one or more transaction records of the third subset of the transaction records identified as directed to the common directory for a further reduction in the amount of memory used by the transaction file.

13. The method of claim 11, wherein coalescing further comprises:
- generating a first transaction record set from the first subset of transaction records directed to the common file; and
- generating a second transaction record set from the third subset of the transaction records directed to the common logical portion of the file.

14. The method of claim 12, wherein coalescing further comprises:
- generating a first transaction record set from the first subset of transaction records directed to the common file; and
- generating a second transaction record set from the third subset of the transaction records directed to the common directory.

15. The method of claim 13 where:
- combining the transaction records of the first transaction record comprises combining the transaction records of the first transaction record set into a first single record directed to the common file; and
- combining the transaction records of the second transaction record set comprises combining the transaction records of the second transaction record set into a second single record directed to the common logical portion of the file.

* * * * *